United States Patent
Lee et al.

(10) Patent No.: US 12,531,109 B2
(45) Date of Patent: Jan. 20, 2026

(54) MEMORY DEVICE

(71) Applicant: Samsung Electronics Co., Ltd., Suwon-si (KR)

(72) Inventors: Seung-Jun Lee, Suwon-si (KR); Younghun Seo, Suwon-si (KR); Hoseok Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 148 days.

(21) Appl. No.: 18/381,115

(22) Filed: Oct. 17, 2023

(65) Prior Publication Data

US 2024/0161810 A1    May 16, 2024

(30) Foreign Application Priority Data

Nov. 11, 2022 (KR) .................. 10-2022-0151010

(51) Int. Cl.
*G11C 11/24* (2006.01)
*G11C 11/408* (2006.01)
*G11C 11/4091* (2006.01)
*G11C 11/4097* (2006.01)

(52) U.S. Cl.
CPC ...... *G11C 11/4091* (2013.01); *G11C 11/4087* (2013.01); *G11C 11/4097* (2013.01)

(58) Field of Classification Search
CPC ............ G11C 11/4091; G11C 11/4087; G11C 11/4097
USPC ....................................................... 365/149
See application file for complete search history.

(56) References Cited

U.S. PATENT DOCUMENTS

| | | | | |
|---|---|---|---|---|
| 5,475,635 A | * | 12/1995 | Nogle | G11C 7/1048 365/177 |
| 5,740,119 A | * | 4/1998 | Asakura | G11C 11/406 365/201 |
| 5,923,605 A | | 7/1999 | Mueller et al. | |
| 5,930,196 A | | 7/1999 | Yim | |
| 5,949,732 A | | 9/1999 | Kirihata | |
| 5,956,285 A | * | 9/1999 | Watanabe | G11C 8/16 365/230.03 |
| 6,003,148 A | * | 12/1999 | Yamauchi | G11C 29/34 365/201 |
| 6,104,653 A | * | 8/2000 | Proebsting | G11C 8/08 257/E21.659 |
| 6,130,852 A | * | 10/2000 | Ohtani | G11C 7/10 365/189.08 |

(Continued)

FOREIGN PATENT DOCUMENTS

KR    1020090128607 A    12/2009

*Primary Examiner* — Viet Q Nguyen
(74) *Attorney, Agent, or Firm* — Muir Patent Law, PLLC

(57) ABSTRACT

A memory device includes a memory cell array which includes a plurality of word lines and a plurality of bit lines; a plurality of column selection lines which extends over the memory cell array and includes a first part of the memory cell array and a second part connected to the first part; a plurality of bit line sense amplifiers each connected to a bit line and configured to sense data stored in a memory cell; a plurality of local sense amplifiers each configured to output the sensed data from one of the bit line sense amplifiers through a column selection transistor connected to a local column selection line; a control logic circuit which generates a row address signal indicating an activation word line and a column address signal indicating an activation bit line; and a column decoder which activates a column selection line based on the column address signal.

19 Claims, 18 Drawing Sheets

(56) References Cited

U.S. PATENT DOCUMENTS

| | | | |
|---|---|---|---|
| 6,249,474 B1 | 6/2001 | Arimoto | |
| 6,421,294 B2 | 7/2002 | Hidaka | |
| 6,449,182 B1 * | 9/2002 | Ooishi | G11C 7/18 365/208 |
| 6,449,198 B1 * | 9/2002 | Hamade | G11C 7/1048 365/230.01 |
| 6,650,583 B2 * | 11/2003 | Haraguchi | G11C 29/44 365/201 |
| 6,741,510 B2 * | 5/2004 | Ohbayashi | G11C 29/18 365/201 |
| 7,190,632 B2 | 3/2007 | Lee | |
| 7,342,835 B2 * | 3/2008 | Tu | G11C 11/406 365/220 |
| 7,423,898 B2 * | 9/2008 | Tanizaki | G11C 13/003 365/230.03 |
| 7,463,536 B2 * | 12/2008 | Scheuerlein | G11C 7/12 365/163 |
| 8,467,217 B2 | 6/2013 | Takayama et al. | |
| 9,042,173 B2 * | 5/2015 | Stiegler | G11C 11/4097 365/207 |
| 9,251,918 B2 * | 2/2016 | Iizuka | G11C 11/1673 |
| 10,074,416 B2 * | 9/2018 | Hush | G11C 11/4093 |
| 10,324,654 B2 * | 6/2019 | Willcock | G06F 15/7821 |
| 10,891,986 B2 * | 1/2021 | Fukushi | G11C 7/06 |
| 10,957,681 B1 | 3/2021 | Fujisawa et al. | |
| 11,031,405 B2 | 6/2021 | Fardad et al. | |
| 11,423,960 B2 * | 8/2022 | Chang | G11C 7/18 |
| 11,735,270 B2 * | 8/2023 | Senoo | G11C 16/0483 365/185.21 |
| 2020/0141228 A1 * | 5/2020 | Khalaj Amineh | E21B 47/006 |
| 2021/0226063 A1 | 7/2021 | Yamazaki et al. | |
| 2022/0028439 A1 * | 1/2022 | Liu | G11C 16/0483 |

* cited by examiner

MEMORY DEVICE

CROSS-REFERENCE TO RELATED APPLICATION(S)

This application claims priority to and the benefit of Korean Patent Application No. 10-2022-0151010 filed on Nov. 11, 2022, in the Korean Intellectual Property Office, the disclosure of which is incorporated herein by reference in its entirety.

BACKGROUND

1. Field

The present disclosure relates to a memory device.

2. Description of the Related Art

In accordance with the development of the electronic industry, demands for high functionalization of electronic components, higher speed, and down-sizing are increasing. Accordingly, in order to improve the integration of the memory device, a size of a memory bank which configures the memory cell array is increasing. In the meantime, when the size of the memory bank is increased, lengths of lines for driving the memory bank are increased, which increases the line loading. There is a problem in that in accordance with the increase of loading, a data transmitting speed is also degraded. Accordingly, a necessity for a placement method which improves a performance of the memory device is emerging.

SUMMARY

The present invention provides a semiconductor memory device which is capable of reducing a power consumption used for the operation.

The present disclosure provides a semiconductor memory device which performs a high speed operation without increasing a size of the semiconductor device.

According to an embodiment, a memory device includes a memory cell array including a plurality of memory cells connected to a plurality of word lines and a plurality of bit lines; a plurality of column selection lines each extending over the memory cell array, including a first part and a second part connected to the first part, and configured to transmit a column selection signal; a plurality of bit line sense amplifiers each connected to a bit line among the plurality of bit lines and configured to sense data stored in a memory cell among the plurality of memory cells; a plurality of local sense amplifiers each configured to output the sensed data from one of the bit line sense amplifiers through a column selection transistor connected to a local column selection line among a plurality of local column selection lines; a control logic circuit configured to generate a row address signal indicating an activation word line among the plurality of word lines and a column address signal indicating an activation bit line among the plurality of bit lines; and a column decoder configured to activate a column selection line among the plurality of column selection lines based on the column address signal; and a plurality of first repeaters connected to each of the column selection lines and each configured to activate a local column selection line among the plurality of local column selection lines in response to a repeater selection signal such that a corresponding one or more column selection transistors are activated. The control logic circuit is further configured to generate the repeater selection signal based on the row address signal.

According to an embodiment, a memory device includes a memory cell array divided into a plurality of memory blocks extending in a first direction, disposed along a second direction intersecting the first direction, and including a plurality of word lines, a plurality of bit lines, and a plurality of memory cells connected to the plurality of word lines and the plurality of bit lines; a plurality of column selection lines extending in the second direction and including odd-numbered column selection lines and even-numbered column selection lines alternately disposed in the first direction; and a plurality of bit line sense amplifiers each connected to a bit line among the plurality of bit lines, including a column selection transistor connected to the bit line, and configured to sense data stored in a memory cell among the plurality of memory cells and to transfer the sensed data to a local input and output line through the column selection transistor, the plurality of bit line sense amplifiers comprising: a plurality of first bit line sense amplifiers which are connected to a plurality of first bit lines among the plurality of bit lines included in a first memory block among the plurality of memory blocks and are commonly connected to one even-numbered column selection line among the even-numbered column selection lines; and a plurality of second bit line sense amplifiers which are connected to a plurality of second bit lines among the plurality of bit lines included in the first memory block and are commonly connected to one odd-numbered column selection line among the odd-numbered column selection lines. The plurality of first bit line sense amplifiers are disposed at one side of each of the even-numbered column selection lines in the first direction and the plurality of second bit line sense amplifiers are disposed at the other side of each of the odd-numbered column selection lines in the first direction.

According to an embodiment, a memory device includes a memory cell array divided into a plurality of memory blocks each extending in a first direction and spaced apart from each other in a second direction intersecting the first direction, the memory cell array including a plurality of memory cells connected to a plurality of word lines and a plurality of bit lines; a control logic circuit configured to generate a row address signal indicating an activation word line among the plurality of word lines and a column address signal indicating an activation bit line among the plurality of bit lines; a plurality of global column selection lines extending in the second direction; a plurality of local column selection lines each including a first part extending in the second direction and a second part extending in the first direction and branched from the first part of each of the plurality of local column selection lines; a column decoder configured to activate a global column selection line among the plurality of global column selection lines in response to the column address signal; a plurality of bit line sense amplifiers each connected to a bit line among the plurality of bit lines, including a column selection transistor connected to a local column selection line among the plurality of local column selection lines, and configured to sense data stored in a memory cell among the plurality of memory cells and to transfer the sensed data to a local input and output line through the column selection transistor. Each of the plurality of global column selection lines is formed of an upper metal disposed above the memory cell array and each of the plurality of local column selection lines is formed of a lower metal disposed below the memory cell array.

DETAILED DESCRIPTION OF THE EMBODIMENTS

Figure 1:
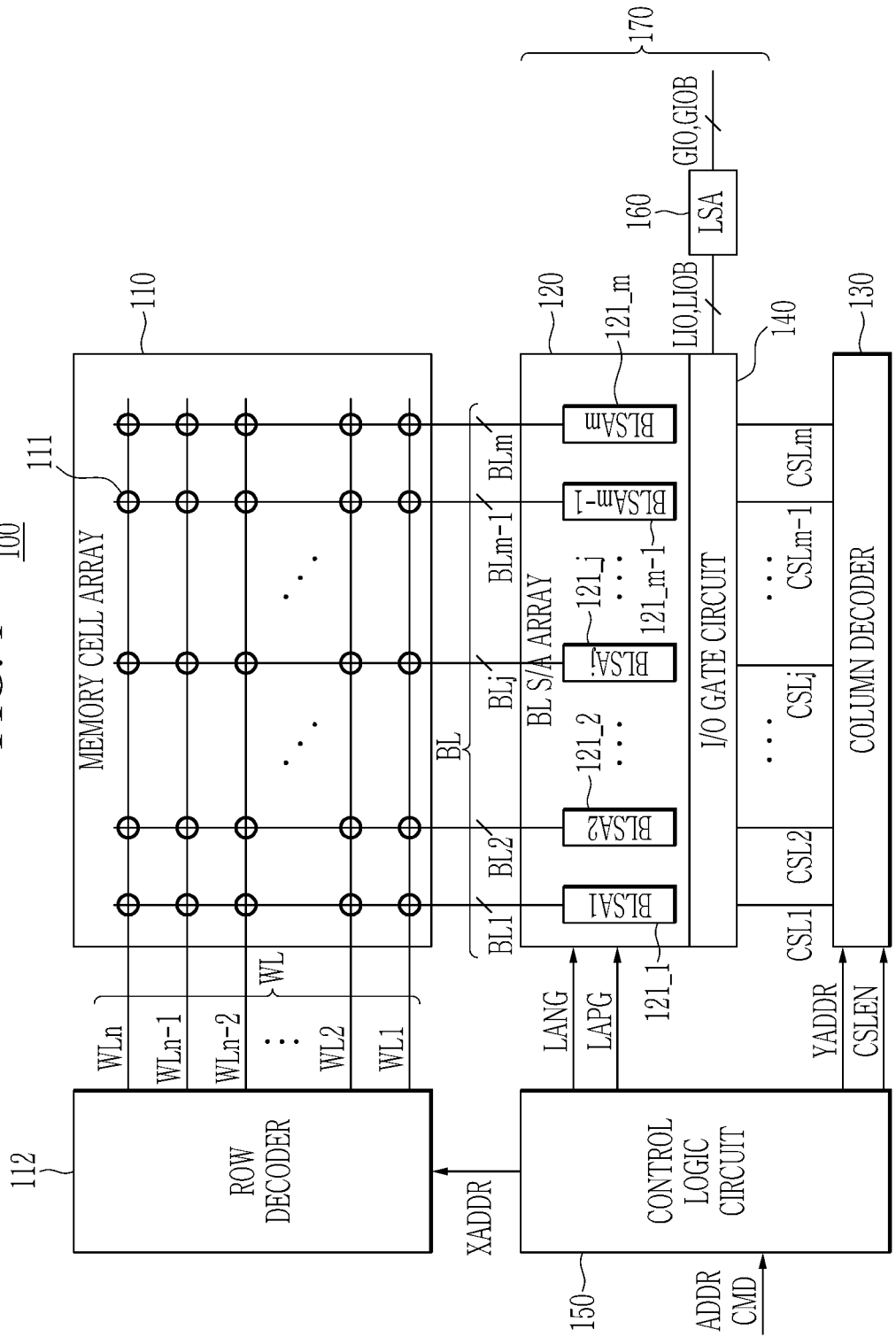
FIG. 1 is a block diagram of a memory device according to an embodiment.

In the following detailed description, only certain embodiments of the present invention have been shown and described, simply by way of illustration. As those skilled in the art would realize, the described embodiments may be modified in various different ways, all without departing from the spirit or scope of the present invention.

Accordingly, the drawings and description are to be regarded as illustrative in nature and not restrictive. Like reference numerals designate like elements throughout the specification.

Further, an expression described in a singular form may be interpreted as a singular form or plural form unless an explicit expression such as "one" or "single" is used. Terms including ordinal numbers such as first or second may be used to describe various constituent elements, but the constituent element is not limited by the terms. These terms may be used to distinguish one constituent element from the other constituent element.

FIG. 1 is a block diagram of a memory device according to an embodiment.

Referring to FIG. 1, a memory device 100 is a semiconductor device based storage device. For example, the memory device 100 may be a volatile memory such as a dynamic random access memory (DRAM), a synchronous DRAM (SDRAM), a double data rate SDRAM (DDR SDRAM), a low power double data rate SDRAM (LPDDR SDRAM), a graphics double data rate SDRAM (GDDR SDRAM), a DDR2 SDRAM, a DDR3 SDRAM, a DDR4 SDRAM, or a thyristor RAM or a nonvolatile memory such as a phase change random access memory (PRAM), a magnetic random access memory (MRAM), or a resistive random access memory (RRAM).

The memory device 100 includes a memory cell array 110, a row decoder 112, a bit line sense amplifier (BLSA) array 120, a column decoder 130, an input and output (input/output, I/O) gate circuit 140, a control logic circuit 150, and a local sense amplifier (LSA) 160.

The bit line sense amplifier (BLSA) array 120 may include a plurality of bit line sense amplifiers (BLSAs). Herein, for convenience of description, the terms of the plurality of bit line sense amplifiers BLSAs 120 and a bit line sense amplifier BLSA 120 may be used interchangeably. Herein, for convenience of description, one bit line sense amplifier may include an I/O gate (CST1 and CST2 of FIG. 2).

The I/O gate circuit 140 may include a plurality of I/O gates. Herein, for convenience of description, the terms of the plurality of I/O gates 140 and an I/O gate 140 may be used interchangeably.

The memory cell array 110 includes a plurality of memory cells 111 defined by a plurality of rows and a plurality of columns. In some embodiments, the plurality of rows is defined by a plurality of word lines (WL1 to WLn, n is a natural number) and a plurality of columns is defined by a plurality of bit lines (BL1 to BLm, m is a natural number). The memory cell array 110 may include a plurality of memory banks. For example, each of the plurality of memory banks may include a bank memory cell array having a plurality of memory cells.

The control logic circuit 150 controls an operation of the memory device 100. The control logic circuit 150 receives a command (CMD), an address (ADDR), and data from an external device (e.g., a memory controller). The address (ADDR) includes a row address signal XADDR indicating one of rows of the memory cell array 110 and a column address signal YADDR indicating one of columns. The control logic circuit 150 generates various control signals required for an access operation to the memory cell array 110, for example, a reading operation, a writing operation, or a refresh operation, in response to a command CMD and the address ADDR. The control signal includes a row address signal (XADDR), a column address signal (YADDR), a N-type sense amplifier driving signal (LANG), a P-type sense amplifier driving signal (LAPG), and a column selection enable signal (CSLEN). Further, the control signal further includes a repeater selection signal (RS) and a memory block selection signal (BLKSEL). The repeater selection signal (RS) and the memory block selection signal (BLKSEL) are generated based on the row address signal (XADDR). The row address signal (XADDR) is provided to the row decoder 112 and the column address signal (YADDR) and the column selection signal (CSL) are provided to the column decoder 130.

The row decoder 112 selects a row to be activated among a plurality of word lines WL1 to WLn of the memory cell array 110 based on the row address signal (XADDR). To this end, the row decoder 112 applies a driving voltage to a word line (WLi, i is a natural number of n or smaller) correspond to a row to be activated.

The column decoder 130 selects a column to be activated among a plurality of bit lines (BL1 to BLm) based on the column address (YADDR). The column decoder 130 selects a column selection line CSLj (j is a natural number of m or smaller) to be activated, among a plurality of column selection lines (CSL1 to CSLm) and selects a bit line to be electrically connected to the column selection line (CSLj) selected by the I/O gate 140.

The bit line sense amplifier array 120 is connected to bit lines BL1 to BLm of the memory cell array 110. The bit line sense amplifier array 120 includes a plurality of bit line sense amplifiers 121_1, 121_2, . . . , and 121_m connected to each bit line BL1 to BLm. The bit line sense amplifier 120_j (j is a natural number of m or smaller) senses a voltage change of corresponding bit lines (BLj) and amplifies and outputs the voltage change. Data of the bit line BLj which is sensed and amplified by the bit line sense amplifier 120_j may be selected by the I/O gate 140.

In the meantime, each of a plurality of bit lines BL1 to BLm may be a bit line pair including a bit line and a complementary bit line. Here, the bit line pair may be implemented by a folded bit line sense amplifier type or an open bit line sense amplifier type, but the present invention is not limited thereto. In the case of the folded bit line sense amplifier type, two bit line sense amplifiers 120 are disposed to be opposite to each other with one memory block therebetween. In the case of the open bit line sense amplifier type, two memory blocks are disposed to be opposite to each other with one bit line sense amplifier 120 therebetween. The I/O gating circuit 140 may include a data latch for storing data read from the memory cell array 110 and a write driver for writing data in the memory cell array 110. The data read from the memory cell array 110 is sensed by the bit line sense amplifier 120 and is transferred to the I/O gating circuit 140.

The column decoder 130 may control the I/O gate 140 to transfer sensed data from the bit line sense amplifier 121_j (j is a natural number of m or smaller) corresponding to the selected column selection line CSLj. As the bit line sense amplifier 121_j is activated, the I/O gate 140 transmits a potential output from the bit line sense amplifier 121_j to a local sense amplifier 160 in response to the selected column selection line CSLj.

The local sense amplifier 160 amplifies a potential difference received from the bit line sense amplifier 121_j by means of a local input and output line pair LIO and LIOB. The local sense amplifier 160 outputs the amplified potential difference to the input and output buffer by means of a global input and output line pair GIO and GIOB. The local sense amplifier 160 provides data stored in the memory cell array 110 to the input and output buffer by means of the global input and output line pair GIO and GIOB.

The bit line sense amplifier array 120, the input and output gate 140, and the local sense amplifier 160 may form a sense amplifier circuit 170 for the memory cell array 110.

Figure 2:
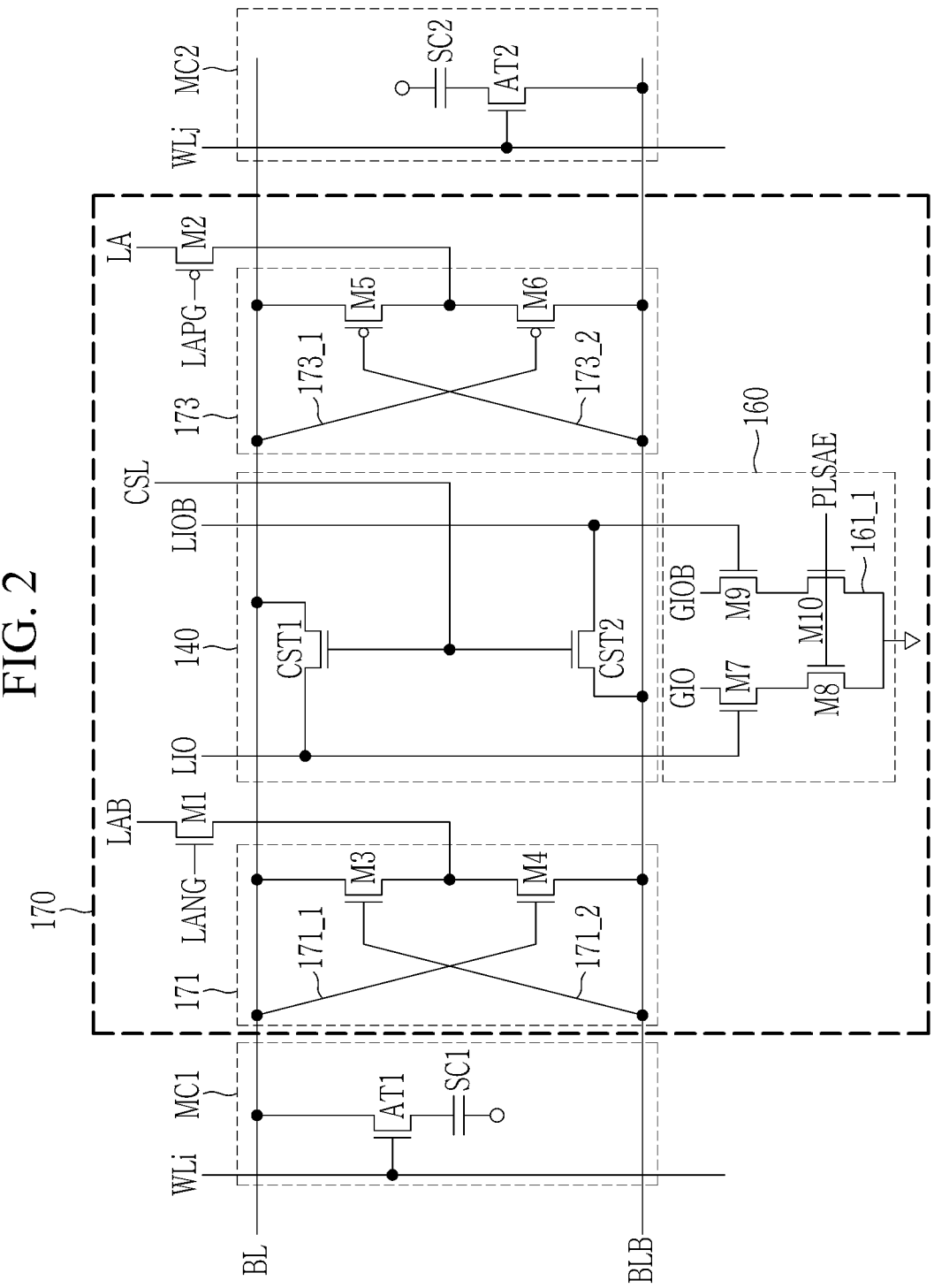
FIG. 2 is a view illustrating a sense amplifier circuit according to an embodiment.

FIG. 2 a view illustrating a sense amplifier circuit according to an embodiment.

Referring to FIG. 2, the sense amplifier circuit 170 is connected to the bit line BL and the complementary bit line BLB. A plurality of first memory cells is connected to the bit line BL and a plurality of word lines WL is connected to the plurality of first memory cells. Further, a plurality of second memory cells is connected to the complementary bit line BLB and a plurality of word lines WL is connected to the plurality of second memory cells. In some embodiments, the sense amplifier circuit 170 may be operated by electrically connection of any one of the bit line BL and the complementary bit line BLB. For better understanding and ease of description, in FIG. 2, one memory cell MC1 connected to the bit line BL, one word line WLi connected to the memory cell MC1, one memory cell MC2 connected to the complementary bit line BLB, and one word line WLj connected to the memory cell MC2 are illustrated. Further, in FIG. 2, even though it is illustrated that the memory cell MC1 includes a switching transistor AT1 and a capacitor SC1 and the memory cell MC2 includes a switching transistor AT2 and a capacitor SC2, the structure of the memory cells MC1 and MC2 are not limited thereto.

The sense amplifier circuit 170 may include a N-type sense amplifier 171, a P-type sense amplifier 173, an input and output (I/O) gate 140, a local sense amplifier 160, and transistors M1, and M2. In some embodiments, the transistors M1 to M10, CST1, and CST2 illustrated in FIG. 2 may be metal oxide semiconductor (MOS) transistors. In some embodiments, transistors M1, M3, M4, M7, M8, M9, M10, CST1, CST2 are n-channel transistors, for example, NMOS transistors. Further, the transistors M2, M5, and M6 are p-channel transistors, for example, PMOS transistors. Each of the transistors M1 to M10, CST1, CST2 has a source, a drain, and a gate as a first input terminal, a second input terminal, and a control terminal.

The N-type sense amplifier 171 includes a third transistor M3 and a fourth transistor M4. A gate of the third transistor M3 is connected to the complementary bit line BLB through a conductive line 171_2. A gate of the fourth transistor M4 is connected to the bit line BL through a conductive line 171_1. A drain of the third transistor M3 and a drain of the fourth transistor M4 are connected to a bit line BL and a complementary bit line BLB, respectively. A first voltage LAB may be input to a source of a third transistor M3 and a source of a fourth transistor M4 in response to the N-type sense amplifier driving signal LANG. The N-type sense amplifier driving signal LANG has an activation level (for example, a high level) to turn on a first transistor M1 and an inactivation level (for example, a low level) to turn off the first transistor M1. The first voltage LAB may be a ground voltage.

The third transistor M3 and the fourth transistor M4 may be turned on or turned off according to the voltage change of the bit line BL or the complementary bit line BLB. When the third transistor M3 is turned on, the first voltage LAB may be provided to the bit line BL. When the fourth transistor M4 is turned on, the first voltage LAB is provided to the complementary bit line BLB.

The P-type sense amplifier 173 includes a fifth transistor M5 and a sixth transistor M6. A gate of the fifth transistor M5 is connected to the complementary bit line BLB through a conductive line 173_2. A gate of the sixth transistor M6 is connected to the bit line BL through a conductive line 173_1. A drain of the fifth transistor M5 and a drain of the sixth transistor M6 are connected to the bit line BL and the complementary bit line BLB, respectively. A second voltage LA is input to a source of the fifth transistor M5 and a source of the sixth transistor M6 in response to the P-type sense amplifier driving signal LAPG. The P-type sense amplifier driving signal LAPG has an activation level (for example, a low level) to turn on the second transistor M2 or an inactivation level (for example, a high level) to turn off the second transistor M2. The second voltage LA may be a power source voltage.

The fifth transistor M5 and the sixth transistor M6 are turned on or turned off in accordance with the voltage change of the bit line BL or the complementary bit line BLB. When the fifth transistor M5 is turned on, the second voltage LA is provided to the bit line BL. When the sixth transistor M6 is turned on, the second voltage LA provides to the complementary bit line BLB.

The input and output gate 140 includes a first column selection transistor CST1 and a second column selection transistor CST2. A drain of the first column selection transistor CST1 is connected to the bit line BL and a drain of the second column selection transistor CST2 is connected to the complementary bit line BLB. A source of the first column selection transistor CST1 is connected to the local input and output line LIO and a source of the second column selection transistor CST2 is connected to a complementary local input and output line LIOB. A column selection line CSL is connected to a gate of the first column selection transistor CST1 and a gate of the second column selection transistor CST2. The bit line pair BL and BLB to which the sense amplifier 170 is connected to the local input and output line pair LIO and LIOB through the first and second column selection transistors CST1 and CST2.

The first and second column selection transistors CST1 and CST2 in the I/O gate 140 transmit potentials output from the N-type sense amplifier 171 and the P-type sense amplifier 173 to the local sense amplifier 160 in response to the column selection signal of the column selection line CSL. Herein, for convenience of description, the terms of the column selection signal and the column selection line CSL may be used interchangeably.

The local sense amplifier 160 includes a seventh transistor M7, an eighth transistor M8, a ninth transistor M9, and a tenth transistor M10. The local sense amplifier 160 may operate by the seventh transistor M7, the eighth transistor M8, the ninth transistor M9, and the tenth transistor M10 through a conductive line 161_1 connected to a ground.

A local enable signal PLSAE is input to the gate of the eighth transistor M8 and the gate of the tenth transistor M10. The gates of the eighth transistor M8 and the tenth transistor M10 are turned on by the local enable signal PLSAE to activate the local sense amplifier 160. When the local sense amplifier 160 is activated, the seventh transistor M7 and the ninth transistor M9 inverts data of the local input and output line pair LIO and LIOB to output data to the global input and output line pair GIO and GIOB.

The memory device 100 operates as follows. First, when the word lines WLi and WLj are activated, a switching transistor AT1 of the memory cell MC1 is turned on to move charges between the bit line BL and a capacitor SC1 in the memory cell MC1 and a switching transistor AT2 of the memory cell MC2 is turned on to move charges between the complementary bit line BLB and a capacitor SC2 in the memory cell MC2. Thereafter, the N-type sense amplifier 171 and the P-type sense amplifier 173 amplifies a potential difference of the bit line BL and the complementary bit line BLB. Thereafter, when the column selection signal becomes an activation level, the input and output gate 140 outputs data of the bit line BL and the complementary bit line BLB through the local input and output line LIO and the complementary local input and output line LIOB. For example, in response to the column selection signal, the first and second column selection transistors CST1 and CST2 in the I/O gate 140 transmits a potential output from the N-type sense amplifier 171 and the P-type sense amplifier 173 to the local sense amplifier 160. The local sense amplifier 160 is activated by the local enable signal PLSAE to invert the received data of the local input and output line pair LIO and LIOB to output the inverted data to the global input and output line pair GIO and GIOB.

Even though it is not illustrated in FIG. 2, the sense amplifier circuit 170 may further include a precharge circuit. The precharge circuit equalizes voltages of the bit line BL and the complementary bit line BLB to a precharge voltage before and after operations of the N-type sense amplifier 171 and the P-type sense amplifier 173.

Figure 3:
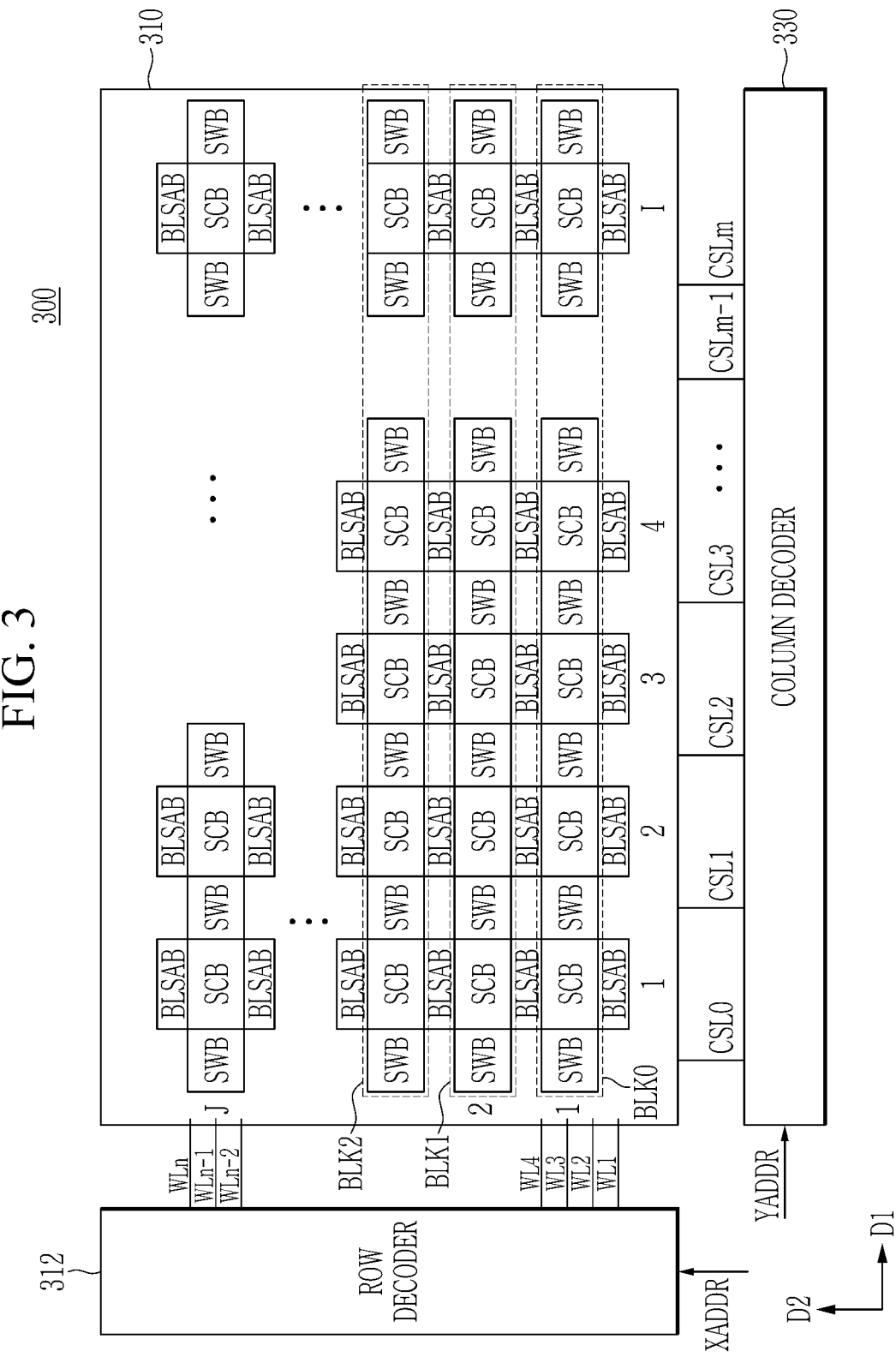
FIG. 3 is a view illustrating a memory cell array and a bit line sense amplifier in a memory device according to an embodiment.

FIG. 3 is a view illustrating a memory cell array and a bit line sense amplifier in a memory device according to an embodiment.

Referring to FIG. 3, a memory device 300 includes a bank array 310, a column decoder 330, and a row decoder 312.

The bank array 310 includes I sub-array blocks SCB (I is a natural number) in a first direction D1 and J sub-array blocks SCB (J is a natural number) in a second direction D2 intersecting the first direction D1. In each sub-array block SCB, a plurality of word lines WL extending in the first direction D1, a plurality of bit lines BL extending in the second direction D2, and memory cells disposed at the intersections of the plurality of word lines WL and the plurality of bit lines BL are disposed. One memory block BLK0, BLK1, or BLK2 includes at least one sub-array block SCB.

Each of I+1 sub-word line driver regions SWB is disposed between two sub-array blocks SCB disposed in the first direction D1. In the sub-word line driver region SWB, a plurality of sub-word line drivers are disposed. The plurality of sub-word line drivers are connected to a plurality of word lines.

Each of J+1 bit line sense amplifier regions BLSAB is disposed between two sub-array blocks SCB disposed in the second direction D2. In the bit line sense amplifier region BLSAB, a plurality of bit line sense amplifiers is disposed.

The sub-word line driver regions SWB and the bit line sense amplifier regions BLSAB in the bank array 310 may be disposed in a peripheral circuit region in which additional peripheral circuits for the operation of the memory device 300 are disposed. For example, the peripheral circuit region is located in a peri substrate (e.g., a substrate or lower peri substrate including a peripheral circuit 190 in FIG. 17) below the sub-array blocks SCB.

The row decoder 312 receives a row address signal XADDR from the control logic circuit 150. The row decoder 312 outputs a driving voltage to a word line WLi (i is a natural number of n or smaller) corresponding to a row to be activated in the bank array 310 among the plurality of word lines WL extending in the first direction D1.

The column decoder 330 receives a column address signal YADDR from the control logic circuit 150. The column decoder 330 outputs a column selection signal to a column selection line connected to a bit line BLj (j is a natural number of m or smaller) corresponding to a column activated in the bank array 310 among the plurality of column selection lines CSL1 to CSLm extending in the second direction D2.

Figure 4:
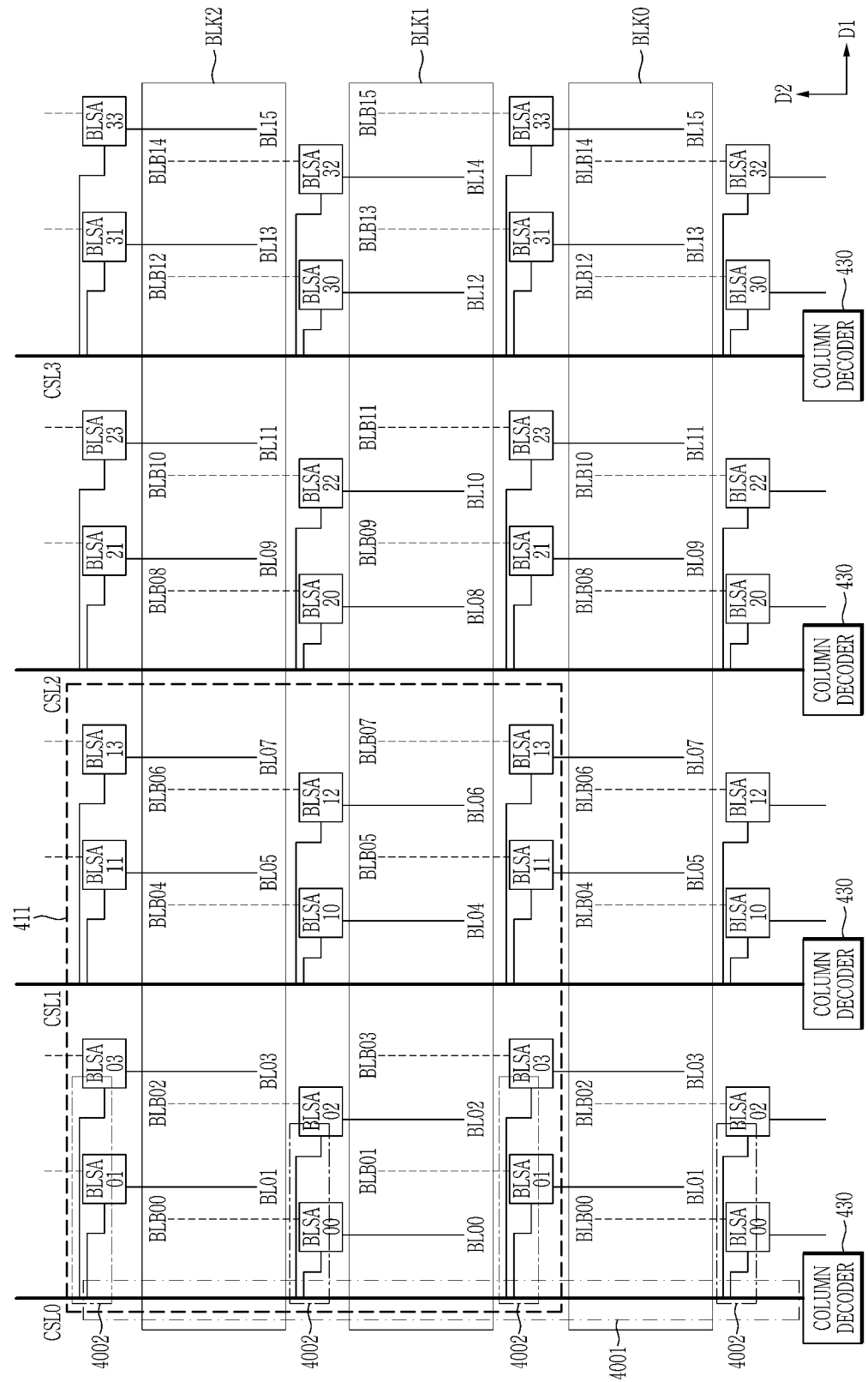
FIG. 4 is a view illustrating a bank array in a memory device according to an embodiment.

FIG. 4 is a view illustrating a bank array in a memory device according to an embodiment.

Referring to FIG. 4, a memory device 400 includes a plurality of memory blocks BLK0, BLK1, and BLK2, a column decoder 430, and a row decoder. In FIG. 4, a part of a plurality of bit lines and a plurality of complementary bit lines which is necessary for the description is illustrated. However, the illustrated pattern of the bit line and the complementary bit line which will be referenced in the following description does not mean the actual pattern of the bit line and the complementary bit line.

Even though in FIG. 4, it is illustrated that three memory blocks BLK0, BLK1, and BLK2 are included, the present invention is not limited thereto and the memory device 400 may include more memory blocks. Each of the memory blocks BLK0, BLK1, and BLK2 includes a plurality of bit lines BL0 to BL15. In each of the memory blocks BLK0, BLK1, and BLK2, the bit lines BL and the complementary bit lines BLB are alternately disposed. In FIG. 4, the bit line BL is illustrated with a solid line and the complementary bit line BLB is illustrated with a dotted line.

Between the memory blocks BLK0, BLK1, and BLK2 in the second direction D2, a plurality of bit line sense amplifiers BLSA00, BLSA01, BLSA02, BLSA03, BLSA10, BLSA11, BLSA12, BLSA13, BLSA20, BLSA21, BLSA22, BLSA23, BLSA30, BLSA31, BLSA32, and BLSA33 is disposed. Herein, for convenience of description, it is described that each bit line sense amplifier may include the N-type sense amplifier 171, the P-type sense amplifier 173, and the first and second column selection transistors CST1 and CST2 of FIG. 2. The bit line sense amplifiers BLSA01, BLSA03, BLSA11, BLSA13, BLSA21, BLSA23, BLSA31, and BLSA33 may be disposed between the memory blocks BLK0 and BLK1 in the second direction D2. The bit line sense amplifiers BLSA00, BLSA02, BLSA10, BLSA12, BLSA20, BLSA22, BLSA30, and BLSA32 may be disposed between the memory blocks BLK1 and BLK2 in the second direction D2. Each of the bit line sense amplifiers BLSA00, BLSA01, BLSA02, BLSA03, BLSA10, BLSA11, BLSA12, BLSA13, BLSA20, BLSA21, BLSA22, BLSA23, BLSA30, BLSA31, BLSA32, and BLSA33 is connected to a corresponding bit line or a complementary bit line. In an embodiment, the plurality of bit line sense amplifiers BLSA00, BLSA01, BLSA02, BLSA03, BLSA10, BLSA11, BLSA12, BLSA13, BLSA20, BLSA21, BLSA22, BLSA23, BLSA30, BLSA31, BLSA32, and BLSA33 may be disposed on a lower peri substrate of the memory blocks BLK0, BLK1, and BLK2. For example, the plurality of bit line sense amplifiers are disposed on the lower peri substrate below the memory blocks BLK0, BLK1, and BLK2.

The column decoder 430 outputs column selection signals through a plurality of column selection lines CSL0 to CSL3. The column selection signals of the column selection lines CSL0 to CSL3 output from the column decoder 430 extend in the same direction as the bit line over all the memory blocks BLK0, BLK1, and BLK2. Each of the column selection lines CSL0 to CSL3 is connected to corresponding bit line sense amplifiers among the bit line sense amplifiers BLSA00, BLSA01, BLSA02, BLSA03, BLSA10, BLSA11, BLSA12, BLSA13, BLSA20, BLSA21, BLSA22, BLSA23, BLSA30, BLSA31, BLSA32, and BLSA33. The first column selection line CSL0 is connected to the bit line sense amplifiers BLSA00, BLSA01, BLSA02, and BLSA03 connected to bit lines BL00 to BL03 and complementary bit lines BLB00 to BLB03. The second column selection line CSL1 is connected to the bit line sense amplifiers BLSA10, BLSA11, BLSA12, and BLSA13 connected to bit lines BL04 to BL07 and complementary bit lines BLB04 to BLB07. The third column selection line CSL2 is connected to the bit line sense amplifiers BLSA20, BLSA21, BLSA22, and BLSA23 connected to bit lines BL08 to BL11 and complementary bit lines BLB08 to BLB11. The fourth column selection line CSL3 is connected to the bit line sense amplifiers BLSA30, BLSA31, BLSA32, and BLSA33 connected to bit lines BL12 to BL15 and complementary bit lines BLB12 to BLB15.

The column decoder 430 outputs column selection signals through the column selection lines CSL0 to CSL3 to control operations of the bit line sense amplifiers BLSA00, BLSA01, BLSA02, BLSA03, BLSA10, BLSA11, BLSA12, BLSA13, BLSA20, BLSA21, BLSA22, BLSA23, BLSA30, BLSA31, BLSA32, and BLSA33.

The column selection line CSL0 may include a first part 4001 formed of an upper metal (hereinafter, the upper metal may correspond to a cell region metal layer MLc in FIG. 17) of each of the memory blocks BLK0, BLK1, and BLK2 and a second part 4002 formed of a lower metal (hereinafter, the lower metal may correspond to a peripheral area metal layer MLp in FIG. 17) of each of the memory blocks BLK0, BLK1, and BLK2. For example, the upper metal of the first part 4001 may be disposed above the memory blocks BLK0, BLK1, and BLK2, and the lower metal of the second part 4002 may be disposed below the memory blocks BLK0, BLK1, and BLK2. In an embodiments, the column selection line CSL0 may include one first part 4001 and a plurality of second parts 4002. The first part 4001 of the column selection line CSL0 may include a conductive line extended in the second direction D2. In the meantime, the column selection line which is branched from the column selection line CSL0 of the first part 4001 to be located in the second part 4002 is referred to as a local column selection line. The local column selection line may be formed of a lower metal of the memory blocks BLK0, BLK1, and BLK2 for connection of the column selection line CSL0 of the first part 4001 formed of the upper metal of the memory blocks BLK0, BLK1, and BLK2 and the bit line sense amplifiers BLSA00, BLSA01, BLSA02, and BLSA03 formed on the lower peri substrate of the memory blocks BLK0, BLK1, and BLK2. The second part 4002 (e.g., the local column selection line) of the column selection line CSL0 may include two conductive lines each connected to a corresponding bit line sense amplifier BLSA. Each of the two conductive lines of the second part 4002 (e.g., the local column selection line) may be extended in the first direction D1.

Similarly, each of the column selection lines CSL1, CSL2, and CSL3 may include a first part formed of an upper metal of each of the memory blocks BLK0, BLK1, and BLK2 and a second part formed of a lower metal of each of the memory blocks BLK0, BLK1, and BLK2, similar to the column selection line CSL0. Each of the column selection lines which is branched from each of the column selection lines CSL1, CSL2, and CSL3 to be located in the second part is referred to as a local column selection line. The local column selection line may be formed of the lower metal of the memory blocks BLK0, BLK1, and BLK2 for connection of the column selection lines CSL1, CSL2, and CSL3 of the first parts formed of the upper metal of the memory blocks BLK0, BLK1, and BLK2 and the bit line sense amplifiers BLSA10, BLSA11, BLSA12, BLSA13, BLSA20, BLSA21, BLSA22, BLSA23, BLSA30, BLSA31, BLSA32, and BLSA33 formed on the lower peri substrate of the memory blocks BLK0, BLK1, and BLK2.

Further, the column decoder 430 may be formed on the lower peri substrate located below the memory blocks BLK0, BLK1, and BLK2. This will be described in detail with reference to FIG. 13.

In FIG. 4, for better understanding and ease of description, a plurality of word lines WL located in the memory blocks BLK0, BLK1, and BLK2, a sub-word line driver SWB connected to each word line WL, and the memory cell and the row decoder connected to the bit line BL and the word line WL are not illustrated.

The connection relationship between the bit line sense amplifier and the bit line in the memory block will be described with reference to FIG. 5.

Figure 5:
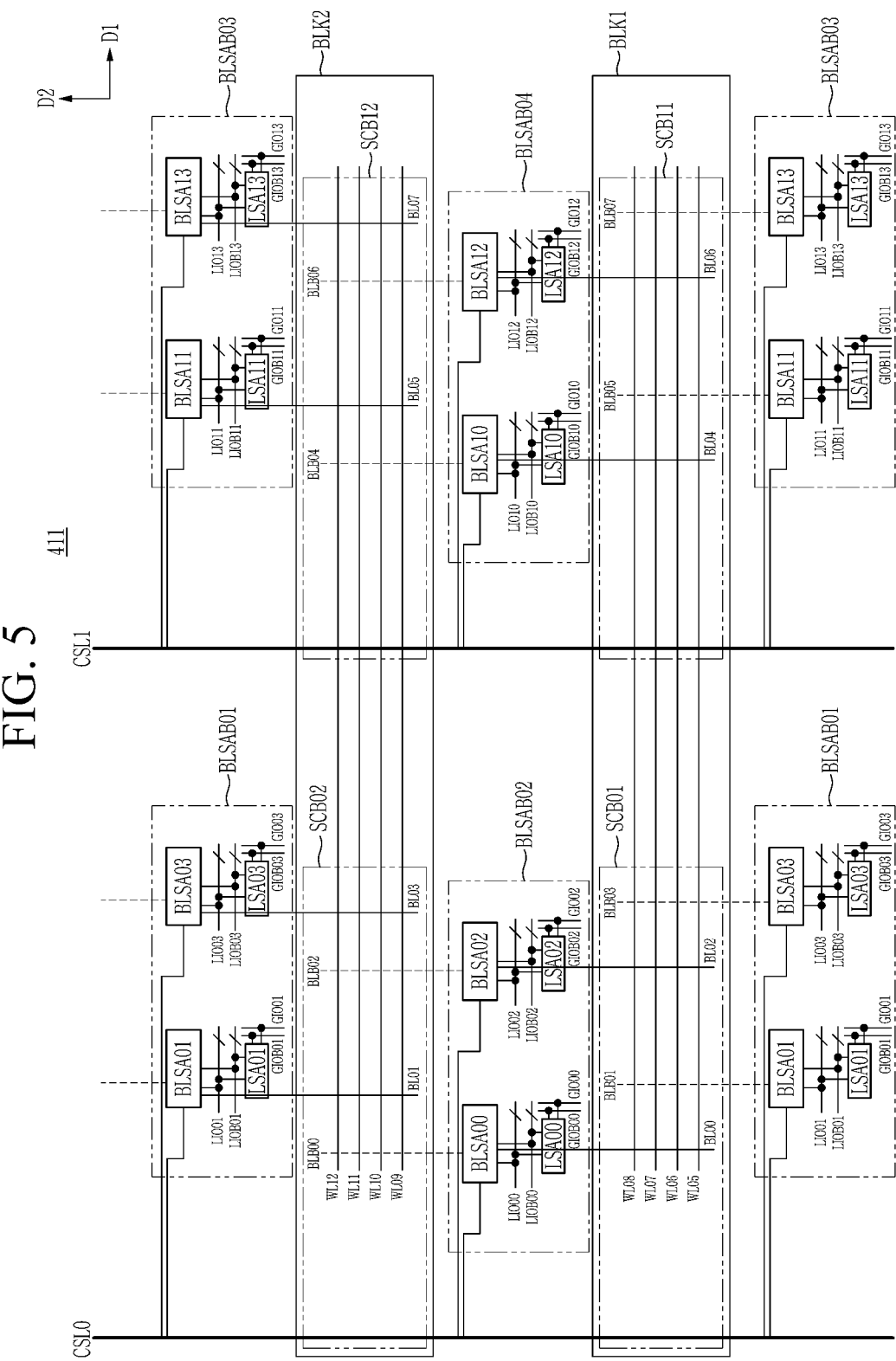
FIG. 5 is a view specifically illustrating a part of a bank array of FIG. 4 according to an embodiment.

FIG. 5 is a view specifically illustrating a part of a bank array of FIG. 4 according to an embodiment. Specifically, FIG. 5 is a view illustrating a part 411 of the memory device 400 of FIG. 4.

In the part 411 of the memory device 400, sub-array blocks SCB01, SCB02, SCB11, and SCB12, and bit line sense amplifier regions BLSAB01, BLSAB02, BLSAB03, and BLSAB04 are disposed. The sub-array blocks SCB01 and SCB11 are included in the memory block BLK1, and sub-array blocks SCB02 and SCB12 are included in the memory block BLK2.

The sub-array block SCB01 includes a plurality of word lines WL05 to WL08, a plurality of bit lines BL00, BLB01, BL02, and BLB03, and a plurality of memory cells connected to the plurality of word lines WL05 to WL08 and the plurality of bit lines BL00, BLB01, BL02, and BLB03. The sub-array block SCB02 includes a plurality of word lines WL09 to WL12, a plurality of bit lines BLB00, BL01, BLB02, and BL03, and a plurality of memory cells connected to the plurality of word lines WL09 to WL12 and the plurality of bit lines BLB00, BL01, BLB02, and BL03. Herein, the plurality of word lines WL05 to WL12 may be connected to a plurality of sub-word line drivers included in the sub-word line driver regions SWB.

The sub-array block SCB11 includes a plurality of word lines WL05 to WL08, a plurality of bit lines BL04, BLB05, BL06, and BLB07, and a plurality of memory cells connected to the plurality of word lines WL05 to WL08 and the plurality of bit lines BL04, BLB05, BL06, and BLB07. The sub-array block SCB12 includes a plurality of word lines WL09 to WL12, the plurality of bit lines BLB04, BL05, BLB06, and BL07, and a plurality of memory cells connected to the plurality of word lines WL09 to WL12 and the plurality of bit lines BLB04, BL05, BLB06, and BL07.

The bit line sense amplifier region BLSAB01 and the bit line sense amplifier region BLSAB02 are alternately disposed between the sub-array block SCB01 and the sub-array block SCB02. The bit line sense amplifier region BLSAB01 includes the bit line sense amplifier BLSA01 and the bit line sense amplifier BLSA03. The bit line sense amplifier region BLSAB02 includes the bit line sense amplifier BLSA00 and the bit line sense amplifier BLSA02. The bit line sense amplifiers BLSA00, BLSA01, BLSA02, and BLSA03 are connected to the column selection line CSL0.

The bit line sense amplifier BLSA00 is connected to the bit line BL00 of the sub-array block SCB01 and the complementary bit line BLB00 of the sub-array block SCB02. The bit line sense amplifier BLSA00 amplifies a difference of voltage levels sensed by the bit line BL00 and the complementary bit line BLB00 and provides the amplified voltage level difference to a local input and output line pair LIO00 and LIOB00. In this case, the bit line sense amplifier BLSA00 includes a column selection transistor pair CST (CST1 and CST2 of FIG. 2) to control the connection of the bit line BL00 and the complementary bit line BLB00 and a local input and output line pair LIO00 and LIOB00. A local sense amplifier LSA00 controls the connection of the local input and output line pair LIO00 and LIOB00 and a global input and output line pair GIO00 and GIOB00.

The bit line sense amplifier BLSA01 may be connected to the complementary bit line BLB01 of the sub-array block SCB01 and the bit line BL01 of the sub-array block SCB02. The bit line sense amplifier BLSA01 amplifies a difference of voltage levels sensed by the bit line BL01 and the complementary bit line BLB01 and provides the amplified voltage level difference to a local input and output line pair LIO01 and LIOB01. In this case, the bit line sense amplifier BLSA01 includes a column selection transistor pair CST (CST1 and CST2 of FIG. 2) to control the connection of the bit line BL01 and the complementary bit line BLB01 and the local input and output line pair LIO01 and LIOB01. A local sense amplifier LSA01 connected to the local input and output line pair LIO01 and LIOB01 controls the connection of the local input and output line pair LIO01 and LIOB01 and a global input and output line pair GIO01 and GIOB01.

The bit line sense amplifier BLSA02 is connected to the bit line BL02 of the sub-array block SCB01 and the complementary bit line BLB02 of the sub-array block SCB02. The bit line sense amplifier BLSA02 amplifies a difference of voltage levels sensed by the bit line BL02 and the complementary bit line BLB02 and provides the amplified voltage level difference to a local input and output line pair LIO02 and LIOB02. In this case, the bit line sense amplifier BLSA02 includes a column selection transistor pair CST (CST1 and CST2 of FIG. 2) to control the connection of the bit line BL02 and the complementary bit line BLB02 and the local input and output line pair LIO02 and LIOB02. A local sense amplifier LSA02 controls the connection of the local input and output line pair LIO02 and LIOB02 and a global input and output line pair GIO02 and GIOB02.

The bit line sense amplifier BLSA03 is connected to the complementary bit line BLB03 of the sub-array block SCB01 and the bit line BL03 of the sub-array block SCB02. The bit line sense amplifier BLSA03 amplifies a voltage level difference sensed by the bit line BL03 and the complementary bit line BLB03 and provides the amplified voltage level difference to a local input and output line pair LIO03 and LIOB03. In this case, the bit line sense amplifier BLSA03 includes a column selection transistor pair CST (CST1 and CST2 of FIG. 2) to control the connection of the bit line BL03 and the complementary bit line BLB03 and the local input and output line pair LIO03 and LIOB03. A local sense amplifier LSA03 connected to the local input and output line pair LIO03 and LIOB03 controls the connection of the local input and output line pair LIO03 and LIOB03 and a global input and output line pair GIO03 and GIOB03.

The bit line sense amplifier region BLSAB03 and the bit line sense amplifier region BLSAB04 may be alternately disposed between the sub-array block SCB11 and the sub-array block SCB12. The bit line sense amplifier region BLSAB03 includes the bit line sense amplifier BLSA11 and the bit line sense amplifier BLSA13. In this case, the bit line sense amplifier region BLSAB04 includes the bit line sense amplifier BLSA10 and the bit line sense amplifier BLSA12. The bit line sense amplifiers BLSA10, BLSA11, BLSA12, and BLSA13 are connected to the column selection line CSL1.

The bit line sense amplifier BLSA10 is connected to the bit line BL04 of the sub-array block SCB11 and the complementary bit line BLB04 of the sub-array block SCB12. The bit line sense amplifier BLSA10 amplifies a difference of voltage levels sensed by the bit line BL04 and the complementary bit line BLB04 and provides the amplified voltage level difference to a local input and output line pair LIO10 and LIOB10. In this case, the bit line sense amplifier BLSA10 includes a column selection transistor pair CST (CST1 and CST2 of FIG. 2) to control the connection of the bit line BL04 and the complementary bit line BLB04 and the local input and output line pair LIO10 and LIOB10. A local sense amplifier LSA10 controls the connection of the local input and output line pair LIO10 and LIOB10 and a global input and output line pair GIO10 and GIOB10.

The bit line sense amplifier BLSA11 is connected to the complementary bit line BLB05 of the sub-array block SCB11 and the bit line BL05 of the sub-array block SCB12. The bit line sense amplifier BLSA11 amplifies a difference of voltage levels sensed by the bit line BL05 and the complementary bit line BLB05 and provides the amplified voltage level difference to a local input and output line pair LIO11 and LIOB11. In this case, the bit line sense amplifier BLSA11 includes a column selection transistor pair CST (CST1 and CST2 of FIG. 2) to control the connection of the bit line BL05 and the complementary bit line BLB05 and the local input and output line pair LIO11 and LIOB11. A local sense amplifier LSA11 connected to the local input and output line pair LIO11 and LIOB11 controls the connection of the local input and output line pair LI011 and LIOB11 and a global input and output line pair GIO11 and GIOB11.

The bit line sense amplifier BLSA12 may be connected to the bit line BL06 of the sub-array block SCB11 and the complementary bit line BLB06 of the sub-array block SCB12. The bit line sense amplifier BLSA12 amplifies a difference of voltage levels sensed by the bit line BL06 and the complementary bit line BLB06 and provides the amplified voltage level difference to a local input and output line pair LI012 and LIOB12. In this case, the bit line sense amplifier BLSA12 includes a column selection transistor pair CST (CST1 and CST2 of FIG. 2) to control the connection of the bit line BL06 and the complementary bit line BLB06 and the local input and output line pair LI012 and LIOB12. A local sense amplifier LSA02 controls the connection of the local input and output line pair LI012 and LIOB12 and a global input and output line pair GIO12 and GIOB12.

The bit line sense amplifier BLSA13 is connected to the complementary bit line BLB07 of the sub-array block SCB11 and the bit line BL07 of the sub-array block SCB12. The bit line sense amplifier BLSA13 amplifies a voltage level difference sensed by the bit line BL07 and the complementary bit line BLB07 and provides the amplified voltage level difference to a local input and output line pair LI013 and LIOB13. In this case, the bit line sense amplifier BLSA13 includes a column selection transistor pair CST (CST1 and CST2 of FIG. 2) to control the connection of the bit line BL07 and the complementary bit line BLB07 and the local input and output line pair LI013 and LIOB13. A local sense amplifier LSA13 connected to the local input and output line pair LI013 and LIOB13 controls the connection of the local input and output line pair LI013 and LIOB13 and a global input and output line pair GIO13 and GIOB13.

In FIG. 5, when one word line is activated, four data are output by connecting four bit line sense amplifiers BLSA to each of the sub-array blocks SCB01, SCB02, SCB11, and SCB12. However, the present invention is not limited thereto and more bit line sense amplifiers BLSA are connected to each of the sub-array blocks SCB01, SCB02, SCB11, and SCB12.

Further, it is illustrated that the bit line sense amplifiers BLSA connected to each of the sub-array blocks SCB01, SCB02, SCB11, and SCB12 are connected to one column selection line. However, the present invention is not limited hereto so that one column selection line CSL may be connected to one bit line sense amplifier BLSA.

Figure 6:
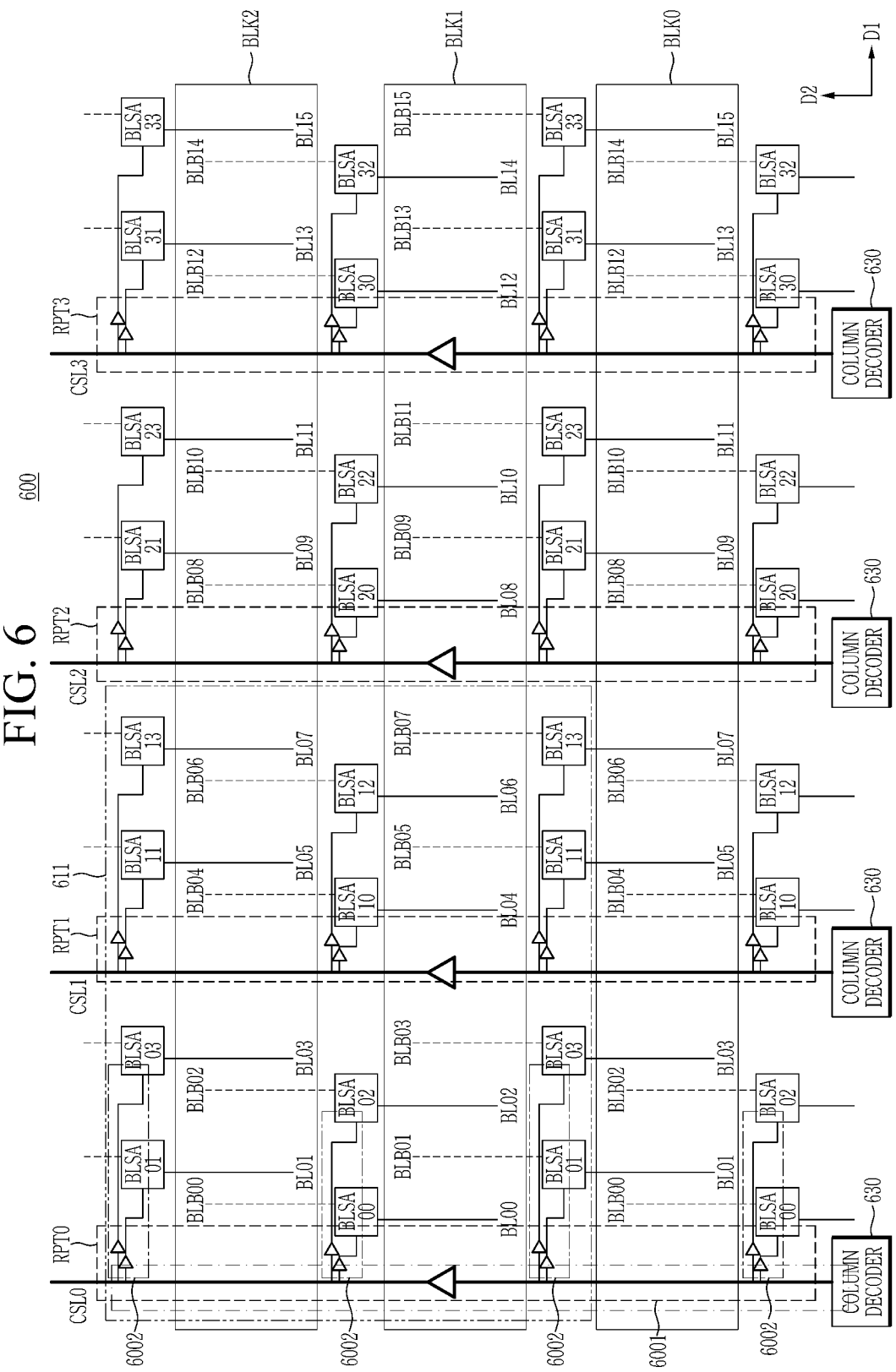
FIG. 6 is a view illustrating another example of a bank array in a memory device according to an embodiment.

FIG. 6 is a view illustrating still another example of a bank array in a memory device according to an embodiment.

A memory device 600 includes a plurality of memory blocks BLK0, BLK1, and BLK2, a column decoder 630, and a row decoder. As illustrated in FIG. 6, the memory device 600 may have the same placement structure as FIG. 4 except for additionally including repeaters.

The column decoder 630 outputs column selection signals through a plurality of column selection lines CSL0 to CSL3. The column selection lines CSL0 to CSL3 output from the column decoder 630 extend in the same direction as the bit line over all the memory blocks BLK0, BLK1, and BLK2. The column decoder 630 outputs the column selection signals through the column selection lines CSL0 to CSL3 to control operations of the bit line sense amplifiers BLSA00, BLSA01, BLSA02, BLSA03, BLSA10, BLSA11, BLSA12, BLSA13, BLSA20, BLSA21, BLSA22, BLSA23, BLSA30, BLSA31, BLSA32, and BLSA33.

The column selection line CSL0 includes a first part 6001 formed of an upper metal of each of the memory blocks BLK0, BLK1, and BLK2 and a second part 6002 formed of a lower metal of each of the memory blocks BLK0, BLK1, and BLK2. Herein, the column selection line CSL0 may include a plurality of second parts 6002. The first part 6001 of the column selection line CSL0 may include a repeater having an input terminal connected to an input conductive line and an output terminal connected to an output conductive line. The input and output conductive lines of the repeater may be extended in the second direction D2. In the meantime, the column selection line which is branched from the column selection line CSL0 of the first part 6001 to be located in the second part 6002 is referred to as a local column selection line. The local column selection line may be formed of the lower metal of the memory blocks BLK0, BLK1, and BLK2 for connection of the column selection line CSL0 of the first part 6001 formed of the upper metal of the memory blocks BLK0, BLK1, and BLK2 and the bit line sense amplifiers BLSA00, BLSA01, BLSA02, and BLSA03 formed on a lower peri substrate of the memory blocks BLK0, BLK1, and BLK2. For example, the second part 6002 (e.g., the local column selection line) of the column selection line CSL0 may include first and second repeaters. The first repeater may include an input terminal connected to an input conductive line of the first repeater and an output terminal connected to an output conductive line of the first repeater, and the second repeater may include an input terminal connected to an input conductive line of the second repeater and an output terminal connected to an output conductive line of the second repeater. The input conductive lines of the first and second repeaters may connect to the first part 6001 of column selection line CSL0 and each of the output conductive lines of the first and second repeaters may connect to a corresponding bit line sense amplifier BLSA. The input and output conductive lines of the first and second repeaters may be extended in the first direction D1.

Similarly, each of the column selection lines CSL1, CSL2, and CSL3 may include a first part formed of an upper metal of each of the memory blocks BLK0, BLK1, and BLK2 and a second part formed of a lower metal of each of the memory blocks BLK0, BLK1, and BLK2, similar to the column selection line CSL0. Each of the column selection lines which is branched from each of the column selection lines CSL1, CSL2, and CSL3 to be located in the second part is referred to as a local column selection line. The local column selection line may be formed of the lower metal of the memory blocks BLK0, BLK1, and BLK2 for connection of the column selection lines CSL1, CSL2, and CSL3 of the first parts formed of the upper metal of the memory blocks BLK0, BLK1, and BLK2 and the bit line sense amplifiers BLSA10, BLSA11, BLSA12, BLSA13, BLSA20, BLSA21, BLSA22, BLSA23, BLSA30, BLSA31, BLSA32, and BLSA33 formed on the lower peri substrate of the memory blocks BLK0, BLK1, and BLK2.

The memory device 600 includes a plurality of repeaters in repeater regions RPT0, RPT1, RPT2, and RPT3 connected to each of the column selection lines CSL0, CSL1, CSL2, and CSL3. The plurality of repeaters of the repeater regions RPT0, RPT1, RPT2, and RPT3 may be disposed on the lower peri substrate of the memory blocks BLK0, BLK1, and BLK2. Each repeater includes an input terminal and an output terminal and amplifies a signal input to the input terminal to be a signal with a larger magnitude and transmits the amplified signal to the output terminal. For example, the repeater may be configured by an even number of CMOS inverters which are connected in series. Herein, each repeater may be configured by a circuit which is enabled or disabled in response to the repeater selection signal RS. Each repeater may operate as a decoder thus the repeater may be referred to as a decoder. The repeater selection signal RS may be generated from the control logic circuit 150 in response to the row address signal XADDR.

In an embodiment, the plurality of repeaters in the repeater regions RPT0, RPT1, RPT2, and RPT3 may be disposed between the memory blocks BLK0, BLK1, and BLK2 in the second direction D2.

Each of the plurality of repeaters located in the repeater regions RPT0, RPT1, RPT2, and RPT3 buffers and transmits a column selection signal to reduce the loading of the column selection line CSL and increase a transmission speed. The loading of the column selection line CSL refers to a period from a command input time to a time when an actual operation is performed when a read command or a writhe command is input to the memory device 600. As the size of the sub-array block SCB is increased, if the column selection line CSL is elongated, the loading of transmitting the column selection signal may be increased. The repeaters in the repeater regions RPT0, RPT1, RPT2, RPT3 are provided to reduce the loading of the column selection signal transmitted to the memory block far from the column decoder 630 and improves the speed.

The repeater region in the memory block will be described with reference to FIG. 7.

Figure 7:
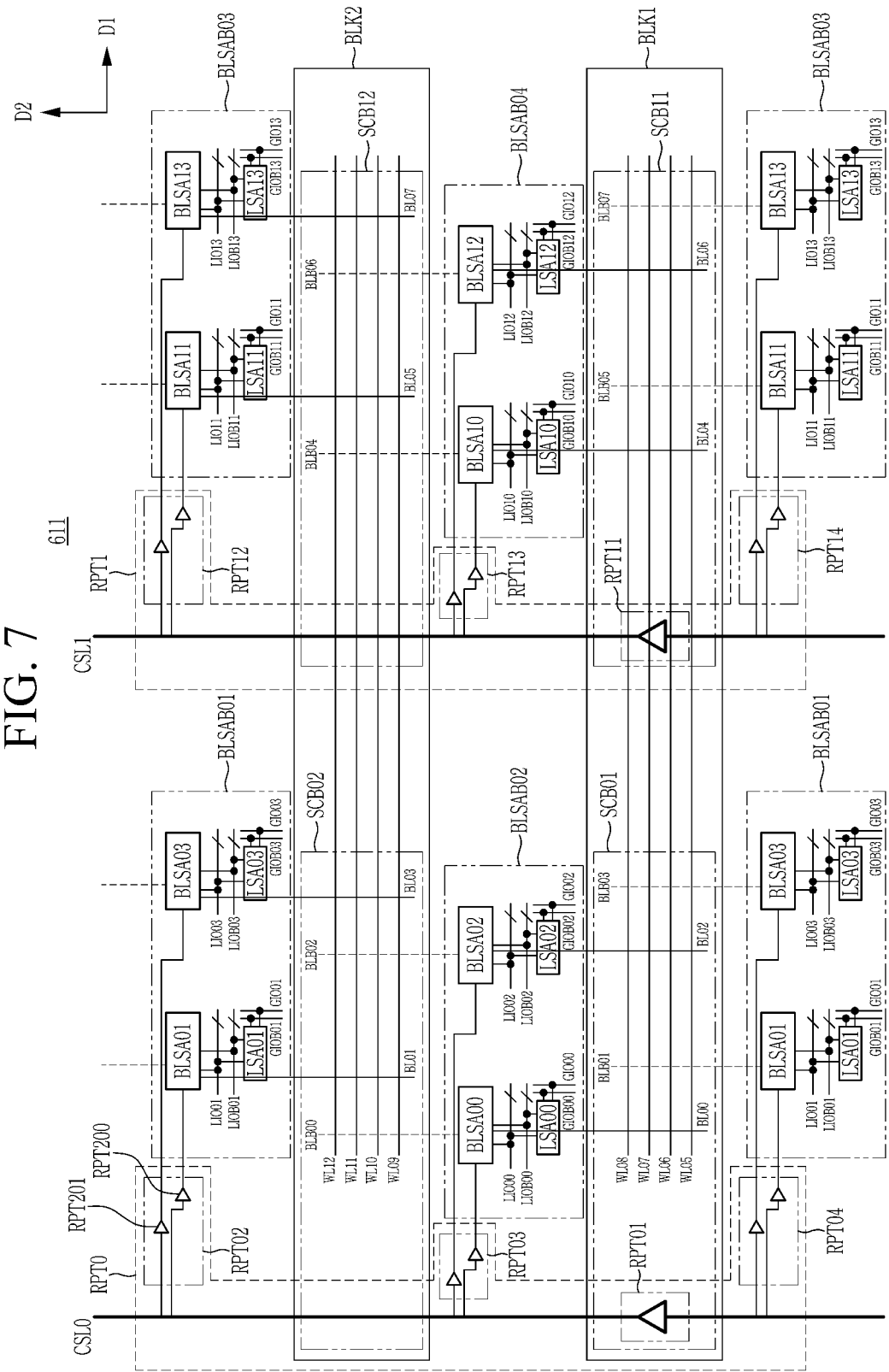
FIG. 7 is a view specifically illustrating a part of a bank array of FIG. 6 according to an embodiment.

FIG. 7 is a view specifically illustrating a part of a bank array of FIG. 6 according to an embodiment. Specifically, FIG. 7 is a view illustrating a part 611 of the memory device 600 of FIG. 6.

A repeater region RPT0 corresponding to a column selection line CSL0 includes repeater regions RPT01, RPT02, RPT03, and RPT04. In an embodiment, each of the repeater regions RPT01, RPT02, RPT03, and RPT04 may include one or more repeaters. For example, the repeater region RPT01 may include one repeater and each of the repeater regions RPT02, RPT03, and RPT04 may include two repeaters. In detail, the repeater region RPT02 may include two repeaters RPT200 and RPT201. The repeater of the repeater region RPT01 has an input terminal connected to an input conductive line and an output terminal connected to an output conductive line. The input and output conductive lines of the repeater may be extended in the second direction D2 in which the bit line extends. The repeaters in the repeater regions RPT02, RPT03, and RPT04 are connected in the first direction D1 which is branched from the column selection line CSL0 to the bit line sense amplifiers BLSA00, BLSA01, BLSA02, and BLSA03 to extend. For example, input and output conductive lines of the repeaters in the repeater regions RPT02, RPT03, and RPT04 may extend in the first direction D1.

Further, a repeater region RPT1 corresponding to the column selection line CSL1 includes repeater regions RPT11, RPT12, RPT13, and RPT14. A repeater of the repeater region RPT11 has an input terminal connected to an input conductive line and an output terminal connected to an output conductive line. The input and output conductive lines of the repeater may be extended in the second direction D2 in which the bit line extends. Repeaters in the repeater regions RPT12, RPT13, and RPT14 are connected in the first direction D1 which is branched from the column selection line CSL1 to the bit line sense amplifiers BLSA10, BLSA11, BLSA12, and BLSA33 to extend. For example, input and output conductive lines of the repeaters in the repeater regions RPT12, RPT13, and RPT14 may extend in the first direction D1.

In the meantime, in FIG. 7, even though it is illustrated that repeaters in the repeater regions RPT02, RPT03, RPT04, RPT12, RPT13, and RPT14 are disposed in the first direction D1, the present invention is not limited thereto and the repeaters may extend in the second direction D2.

Even though in FIG. 7, it is illustrated that one repeater is included on each line transmitted from the column selection line CSL to each of the bit line sense amplifiers BLSA00, BLSA01, BLSA02, and BLSA03, the present invention is not limited thereto and more or less number of repeaters may be included. This will be described below with reference to FIGS. 8 and 9. Further, even though in FIG. 7, it is illustrated that each of the column selection lines extends cross two sub-array blocks SCBs and then include one repeater, the present invention is not limited thereto and more or less number of repeaters may be included. This will be described below with reference to FIG. 10. The control logic circuit (150 of FIG. 1) controls a plurality of repeaters in the repeater regions RPT01, RPT02, RPT03, RPT11, RPT12, and RPT13 by means of the repeater selection signal RS. When each repeater in the repeater regions RPT01, RPT02, RPT03, RPT11, RPT12, and RPT13 receives an enable level of the repeater selection signal RS, the repeater amplifies a column selection signal input to the input terminal of the repeater to output the amplified signal to the output terminal of the repeater. If a disable level of the repeater selection signal RS is input to each of the repeaters in the repeater regions RPT01, RPT02, RPT03, RPT11, RPT12, and RPT13, each repeater in the repeater regions RPT01, RPT02, RPT03, RPT11, RPT12, and RPT13 may not output a signal input to the input terminal to the output terminal thereof.

In an embodiment, the column decoder 630 may output column selection signals to input conductive lines of repeaters of the repeater regions RPT01 and RPT11 in response to the column address YADDR and the repeaters of the repeater regions RPT01 and RPT11 may output column selection signals to output conductive lines of the repeater regions RPT01 and RPT11 in response to the repeater selection signal RS. For example, repeaters of the repeater region RPT04 may be connected to the input conductive line of the repeater in the repeater region RPT01 and repeaters of the repeater region RPT03 may be connected to the output conductive line of the repeater in the repeater region RPT01.

The control logic circuit (150 of FIG. 1) generates the repeater selection signal RS based on a row address signal XADDR. Specifically, the control logic circuit 150 may determine which a memory block BLK needs to be activated through information about a row to be activated included in the row address signal XADDR. Further, the control logic circuit 150 may determine which bit line sense amplifier BLSA needs to be activated through information about a column to be activated included in the column address signal YADDR. Thereafter, the control logic circuit 150 generates the repeater selection signal RS which activates a plurality of repeaters located on a path to the memory block BLK to be activated and activates a plurality of repeaters located on a path to a bit line sense amplifier BLSA to be activated. For example, it is assumed that data of memory cells connected to bit lines BL00 to BL03 and complementary bit lines BLB00 to BLB03 located in a column to be activated and a word line WL12 located in a row to be activated is read. The control logic circuit 150 generates a repeater selection signal RS which activates a repeater in the repeater region RPT01 located on the column selection line CSL0 path from the column decoder 630 to the memory block BLK2 to be activated and repeaters in the repeater regions RPT02 and RPT03 located on a path to the bit line sense amplifiers BLSA00, BLSA01, BLSA02, and BLSA03 connected to the word line WL12 from the column selection line CSL0. In this case, the repeaters in the repeater region RPT04 may not be activated. For example, the column selection signal is repeated by a plurality of enabled repeaters of the column selection line CSL to be applied to a gate of the column selection transistor CST. It is determined whether the repeaters located on the column selection line CSL based on a row address XADDR to be activated operate so that the column selection signal may be transmitted to only some bit line sense amplifiers BLSA (i.e., to the I/O gates of some bit line sense amplifiers BLSA). Accordingly, power consumption used for a read operation and a write operation of the memory device may be reduced.

In the meantime, a degree of amplifying an input signal by a repeater varies depending on a size of an element which configures the repeater so that the size of the repeaters located in the repeater regions RPT0, RPT1, RPT2, and RPT3 may be adjusted in various sizes depending on a distance from the column decoder 630. For example, sizes of an NMOS transistor and a PMOS transistor which configure a CMOS inverter of a repeater located in the repeater region RPT02 may be larger than sizes of an NMOS transistor and a PMOS transistor which configure a CMOS inverter of a repeater located in the repeater region RPT04.

Further, sizes of the repeaters located in the repeater regions RPT02, RPT03, RPT04, RPT12, RPT13, and RPT14 may be controlled in various sizes depending on a distance from the column selection lines CSL0 and CSL1 to the repeater. For example, the repeater RPT201 located in the repeater region RPT02 is connected to be spaced apart from the column selection line CSL0 with a first distance and the repeater RPT200 is connected to be spaced apart from the column selection line CSL0 with a second distance which is larger than the first distance. In this case, the repeater RPT200 is located to be farther from the column selection line CSL0 so that a size of transistors which configure the repeater RPT200 may be smaller than a size of transistors which configure the repeater RPT201.

The repeaters in the repeater regions RPT01, RPT02, RPT03, RPT11, RPT12, and RPT13 and the bit line sense amplifiers BLSA00, BLSA01, BLSA02, BLSA03, BLSA10, BLSA11, BLSA12, and BLSA13 are disposed on the lower peri substrate located below the memory blocks BLK0, BLK1, and BLK2 so that the loading of transmitting the column selection signal may be reduced without increasing a chip size.

Figure 8:
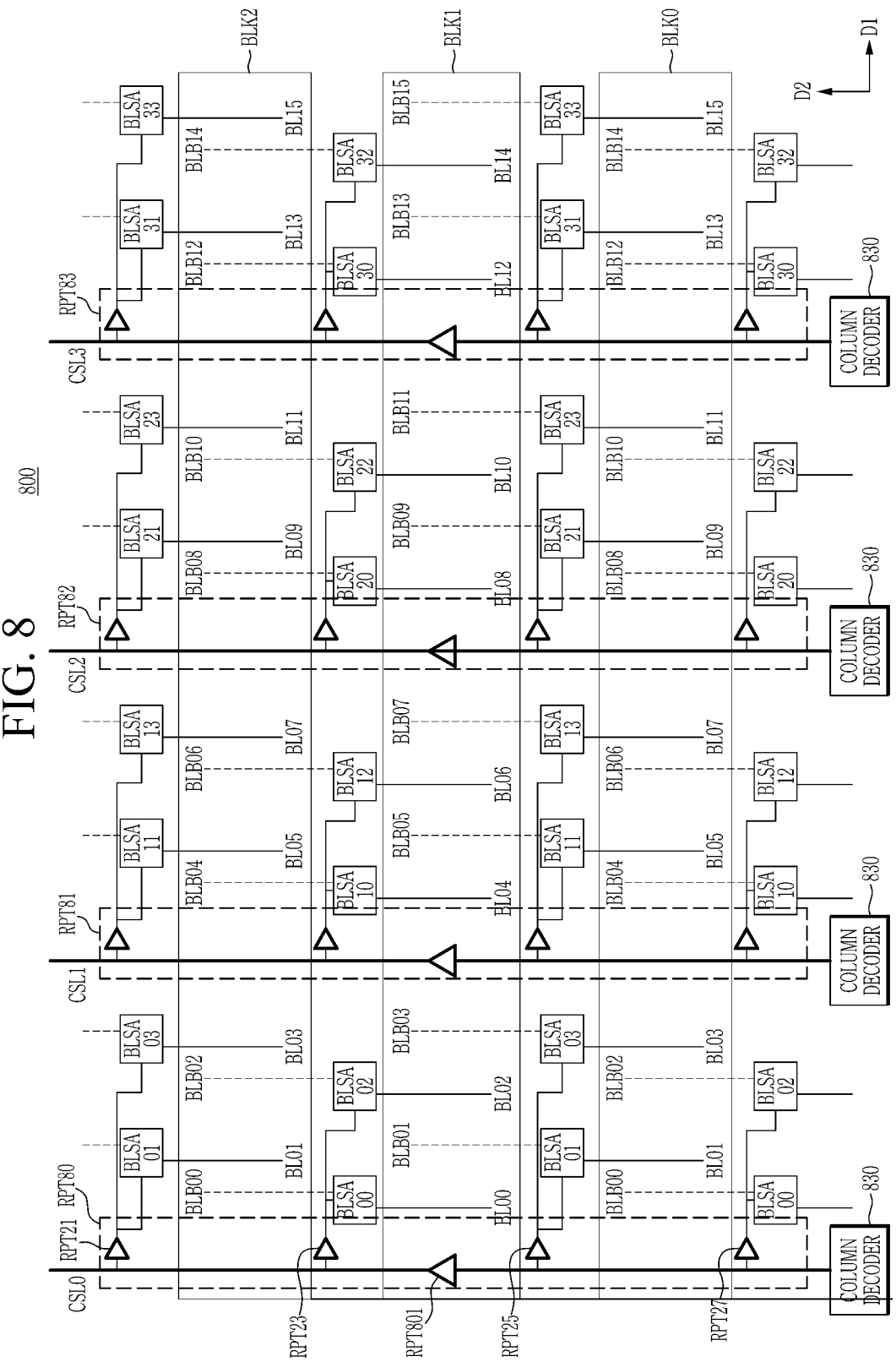
FIG. 8 is a view illustrating another example of a bank array in a memory device according to an embodiment.

FIG. 8 is a view illustrating another example of a bank array in a memory device according to an embodiment.

A memory device 800 includes a plurality of memory blocks BLK0, BLK1, and BLK2, a column decoder 830, and a row decoder (not shown). As illustrated in FIG. 8, the memory device 800 may have the same structure as FIG. 6 except for different placement of the repeater.

Referring to FIG. 8, a repeater region RPT80 corresponding to a column selection line CSL0 includes repeaters RPT801, RPT21, RPT23, RPT25, and RPT27. In example embodiments, each of the repeaters RPT801, RPT21, RPT23, RPT25, and RPT27 may be activated in response to the repeater selection signal RS. The repeater RPT801 may be disposed in the second direction D2 in which the bit line extends. The repeaters RPT21, RPT23, RPT25, and RPT27 are connected in the first direction D1 which is branched from the column selection line CSL0 to the bit line sense amplifiers BLSA to extend. For example, one repeater has an input terminal connected to the column selection line CSL0 and an output terminal connected to bit line sense amplifiers BLSA00 and BLSA02 through one conductive line. Similarly, one repeater has an input terminal connected to the column selection line CSL0 and an output terminal connected to bit line sense amplifiers BLSA01 and BLSA03 through one conductive line.

Each of the repeater regions RPT81, RPT82, RPT83 may have a similar placement to the repeater region RPT80.

In FIG. 8, even though it is illustrated that repeaters RPT21, RPT23, RPT25, and RPT27 are connected in the first direction D1, the present invention is not limited thereto, and the repeaters may extend in the second direction D2.

Figure 9:
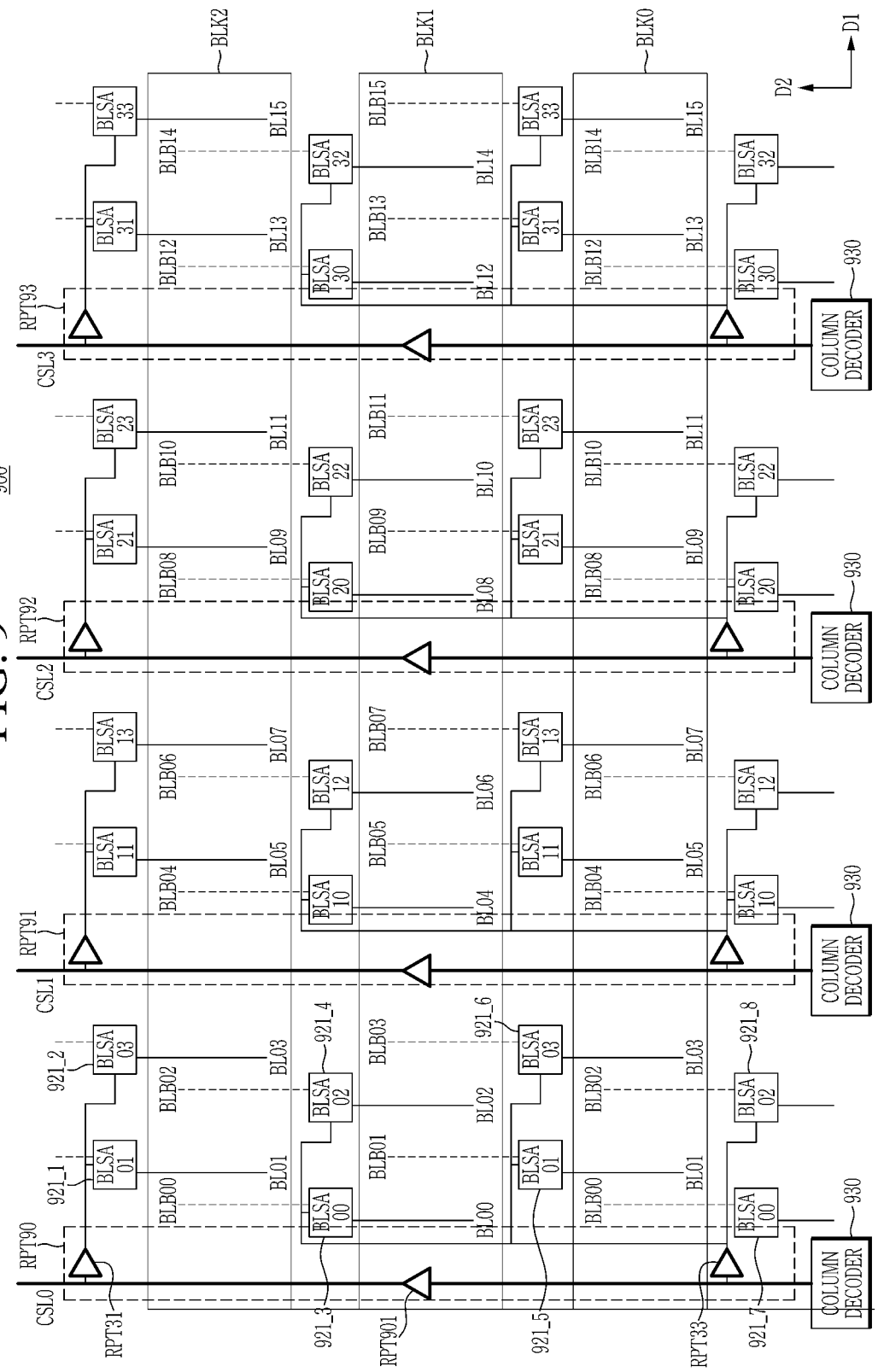
FIG. 9 is a view illustrating still another example of a bank array in a memory device according to an embodiment.

FIG. 9 is a view illustrating still another example of a bank array in a memory device according to an embodiment.

A memory device 900 includes a plurality of memory blocks BLK0, BLK1, and BLK2, a column decoder 930, and a row decoder (not shown). As illustrated in FIG. 9, the memory device 900 may have the same structure as FIG. 6 except for different placement of a repeater.

Referring to FIG. 9, a repeater region RPT90 corresponding to a column selection line CSL0 includes repeaters RPT901, RPT31, and RPT33. In example embodiments, each of the repeaters RPT901, RPT31, and RPT33 may be activated in response to the repeater selection signal RS. The repeater RPT901 is disposed in the second direction D2 in which the bit line extends. The repeaters RPT31 and RPT33 are connected in the first direction D1 which is branched from the column selection line CSL0 to the bit line sense amplifiers BLSA to extend. Specifically, the column selection line CSL0 is branched through the repeater RPT33 to be connected to bit line sense amplifiers 921_3, 921_4, 921_5, 921_6, 921_7, and 921_8. For example, one repeater RPT33 is connected to bit line sense amplifiers connected to the memory blocks BLK0, BLK1, and BLK2. The column selection line CSL0 is connected to bit line sense amplifiers connected to memory bank BLK2 and BLK3 (not shown) through the repeater RPT31.

Repeater regions RPT91, RPT92, and RPT93 may have a placement similar to that of the repeater region RPT90.

Even though in FIG. 9, the repeaters RPT31 and RPT33 are connected in the first direction D1, the present invention is not limited thereto and the repeaters RPT31 and RPT33 may extend in the second direction D2.

Figure 10:
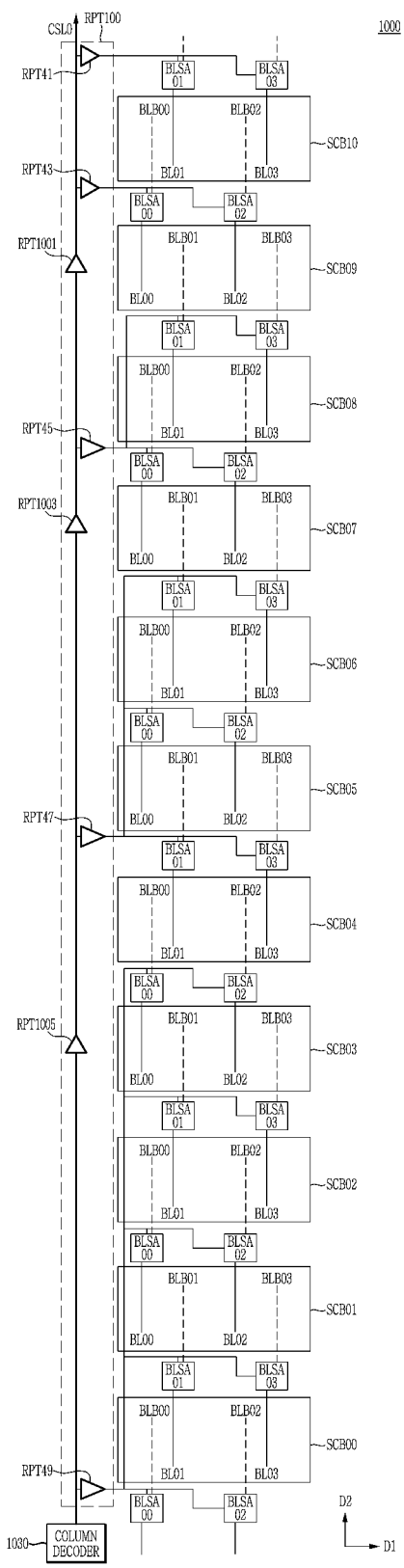
FIG. 10 is a view illustrating still another example of a bank array in a memory device according to an embodiment.

FIG. 10 is a view illustrating still another example of a bank array in a memory device according to an embodiment.

Specifically, a memory device 1000 includes a plurality of sub-array blocks SCB00 to SCB10, a column decoder 1030, and a row decoder (not shown). As illustrated in FIG. 10, the memory device 1000 may have the same structure as FIG. 6 except for different placement of the repeater. Even though in FIG. 10, only bit line sense amplifiers connected to a column selection line CSL0 are illustrated, the memory device 1000 may also include column selection lines CSL1, CSL2, and CSL3.

Referring to FIG. 10, a repeater region RTP100 corresponding to a column selection line CSL0 includes repeaters RPT1001, RPT1003, RPT1005, RPT41, RPT43, RPT45, RPT47, and RPT49. In example embodiments, each of the repeaters RPT1001, RPT1003, RPT1005, RPT41, RPT43, RPT45, RPT47, and RPT49 may be activated in response to the repeater selection signal RS. The repeaters RPT1001, RPT1003, RPT1005 are disposed in the second direction D2 in which the bit line extends. The repeaters RPT41, RPT43, RPT45, RPT47, and RPT49 are connected in the first direction D1 which is branched from the column selection line CSL0 to the bit line sense amplifiers BLSA to extend. Specifically, the column selection line CSL0 is branched through the repeater RPT49 to be connected to bit line sense amplifiers connected to the sub-array blocks SCB00 to SCB02. Further, the column selection line CSL0 is branched through the repeater RPT47 to be connected to bit line sense amplifiers connected to the sub-array blocks SCB02 to SCB07. Moreover, the column selection line CSL0 is branched through the repeater RPT45 to be connected to bit line sense amplifiers connected to the sub-array blocks SCB07 to SCB09. The column selection line CSL0 is branched through the repeater RPT43 to be connected to bit line sense amplifiers connected to the sub-array blocks SCB09 and SCB10. The column selection line CSL0 is branched through the repeater RPT41 to be connected to bit line sense amplifiers connected to the sub-array block SCB10. In summary, a number of sub-array blocks (that is, five) connected to the repeater RPT49 located in a first distance from the column decoder 1030 may be larger than a number of sub-array blocks (that is, four) connected to the repeater RPT47 located in a second distance which is farther than the first distance, from the column decoder 1030. For example, the number of sub-array blocks connected to each repeater may vary depending on a distance between each repeater and the column decoder 1030 and the larger the distance between the repeater and the column decoder 1030, the smaller the number of sub-array blocks connected to the repeater.

Even though in FIG. 10, it is illustrated that repeaters RPT41, RPT43, RPT45, RPT47, and RPT49 are connected in the first direction D1, the present invention is not limited thereto and the repeaters may extend in the second direction D2.

Figure 11:
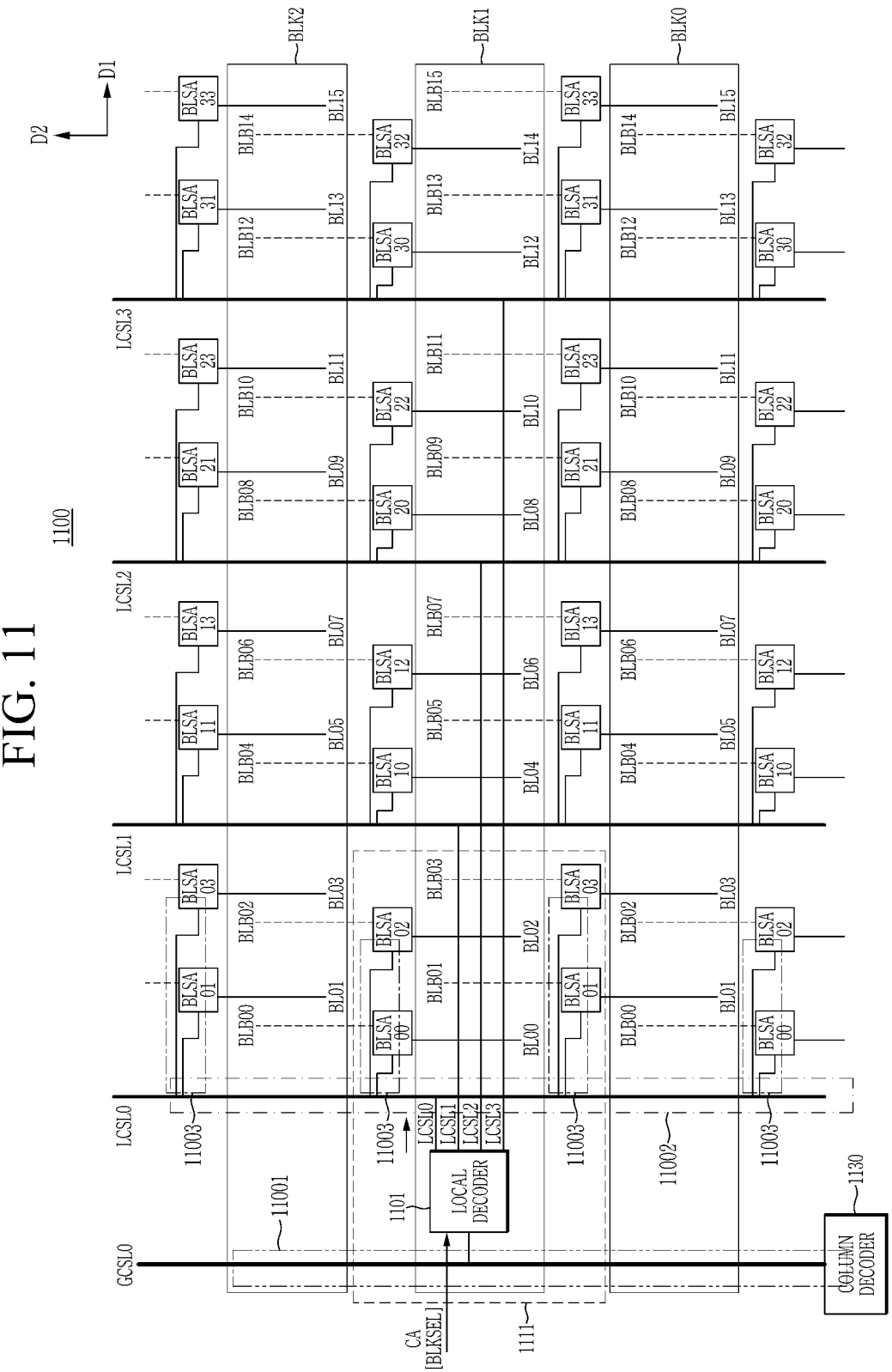
FIG. 11 is a view illustrating still another example of a bank array in a memory device according to an embodiment.

FIG. 11 is a view illustrating still another example of a bank array in a memory device according to an embodiment.

A memory device 1100 includes a plurality of memory blocks BLK0, BLK1, and BLK2, a column decoder 1130, and a row decoder (not shown). As illustrated in FIG. 11, the memory device 1100 may have the same placement structure as that in FIG. 4 except for additionally including a local decoder 1101 and a global column selection line GCSL0.

The column decoder 1130 outputs a column selection signal through the global column selection line GCSL0. The global column selection line GCSL0 output from the column decoder 1130 extends in the same direction as the bit line over all the memory blocks BLK0, BLK1, and BLK2. The global column selection line GCSL0 may be connected to a plurality of local column selection lines LCSL0 to LCSL3 through the local decoder 1101. The plurality of local column selection lines LCSL0 to LCSL3 extends in the same direction as the bit line over all the memory blocks BLK0, BLK1, and BLK2.

The global column selection line GCSL0 includes a first part 11001. The local column selection line LCSL0 includes a second part 11002 and a third part 11003. The first part 11001 may be formed of an upper metal of each of the memory block BLK0, BLK1, and BLK2. The local decoder 1101 may be located below the memory blocks BLK0, BLK1, and BLK2. Although not shown, the local decoder 1101 may be located between the memory blocks BLK0 and BLK1, or BLK1 and BLK2. The second part 11002 is formed of an upper metal of each of the memory blocks BLK0, BLK1, and BLK2 or a lower metal of each of the memory blocks BLK0, BLK1, and BLK2. The third part 11003 is formed of a lower metal of each of the memory block BLK0, BLK1, and BLK2.

Similarly, each of the local column selection lines LCSL1, LCSL2, and LCSL3 also includes a second part and a third part, similar to the local column selection line LCSL0. Each of the column selection lines which is branched from each of the local column selection lines LCSL1, LCSL2, and LCSL3 to be located in the third part is referred to as a sub-local column selection line. The sub-local column selection line may be formed of a lower metal of the memory blocks BLK0, BLK1, and BLK2 for connection of the second part 11002 of each of the local column selection lines LCSL1, LCSL2, and LCSL3 formed of the lower metal of the memory blocks BLK0, BLK1, and BLK2 and the bit line sense amplifiers BLSA10, BLSA11, BLSA12, BLSA13, BLSA20, BLSA21, BLSA22, BLSA23, BLSA30, BLSA31, BLSA32, and BLSA33 formed on the lower peri substrate of the memory blocks BLK0, BLK1, and BLK2.

Even though in FIG. 11, only one global column selection line GCSL0 is illustrated, the memory device 1100 includes a plurality of global column selection lines and each global column selection line is connected to a plurality of local decoders connected to the plurality of local column selection lines. In this case, the plurality of local decoders may be disposed along each global column selection line in the second direction D2. Further, even though in FIG. 11, it is illustrated that one local decoder 1101 is connected to four local column selection lines LCSL0, LCSL1, LCSL2, and LCSL3, the present invention is not limited thereto and one local decoder 1101 may be connected to four or less or more local column selection lines.

The local decoder 1101 is connected to the global column selection line GSL0 and the plurality of column selection lines CSL0 to CSL3. The local decoder 1101 may be implemented by a multiplexer, but is not limited thereto.

The local decoder 1101 outputs a local column selection signal transmitted from the global column selection line GCSL to one local column selection line LCSL corresponding to a column address signal CA (herein, CA may be some of the column address signal YADDR) in response to a memory block selection signal BLKSEL (herein, BLKSEL may be some of the row address signal XADDR). For example, the control logic circuit 150 of FIG. 1 may generate the column address signal CA and the memory block selection signal BLKSEL. Specifically, the local decoder 1101 selected by the memory block selection signal BLKSEL selects one local column selection line LCSL among the plurality of local column selection lines LCSL based on the column address signal CA. As illustrated in FIG. 11, the column address signal CA for selecting one local column selection line among four local column selection lines LCSL may be a 2-bit signal. In some embodiments, the column address signal CA for selecting one local column selection line among eight local column selection lines LCSL may be a 3-bit signal.

The connection relationship between the local decoder 1101 and the local column selection line LCSL will be described with reference to FIG. 12.

Figure 12:
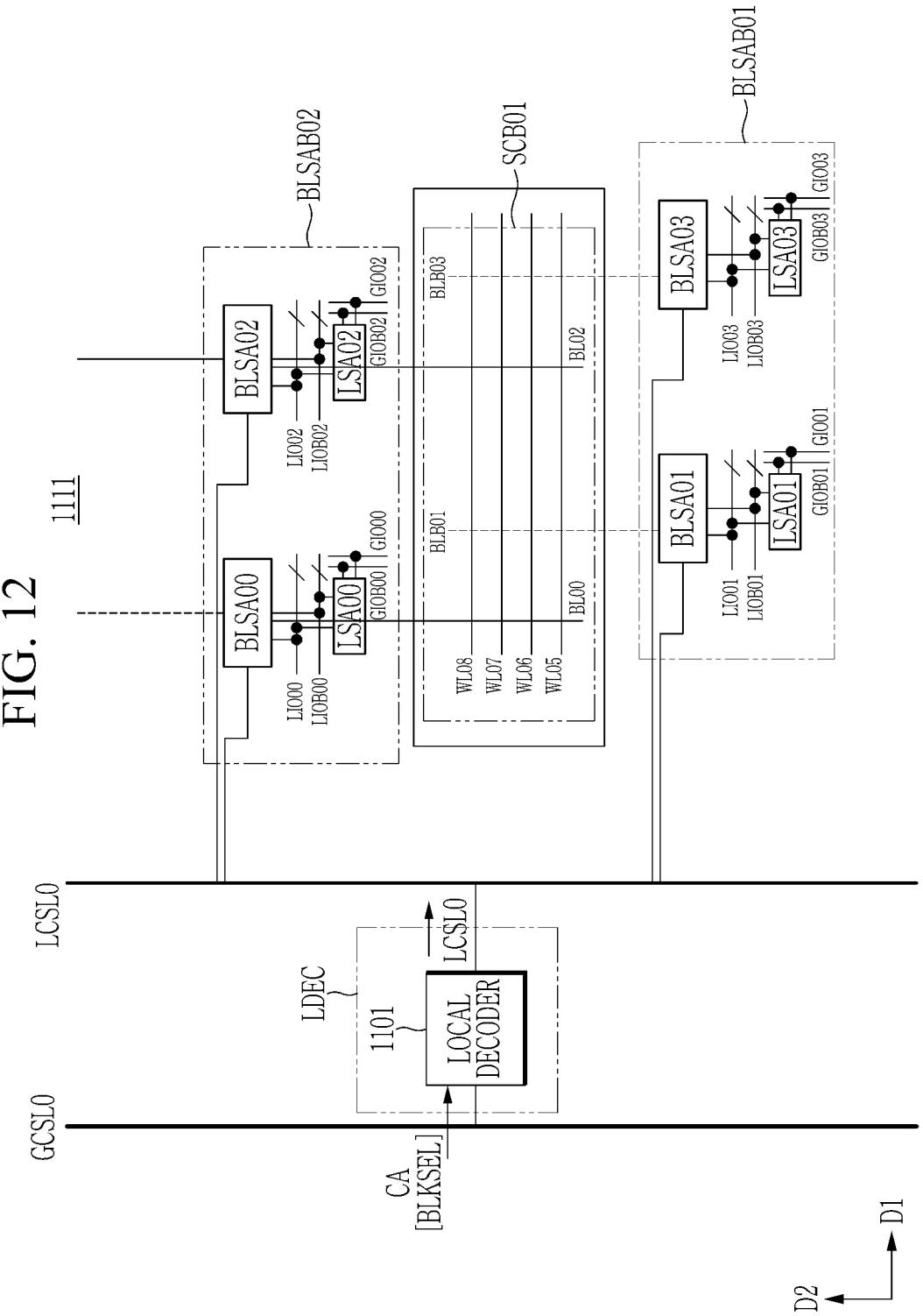
FIG. 12 is a view specifically illustrating a part of a bank array of FIG. 11 according to an embodiment.

FIG. 12 is a view specifically illustrating a part of a bank array of FIG. 11 according to an embodiment. Specifically, FIG. 12 is a view illustrating a part 1111 of the memory device 1100 when the local decoder 1101 of FIG. 11 outputs a local column selection signal to the local column selection line LCSL0. The local column selection line LCSL0 of the local decoder 1101 may connect to the bit line sense amplifiers BLSA00, BLSA01, BLSA02, and BLSA03 corresponding to one sub-array block SCB01. Another local column selection line LCSL0 of one local decoder 1102 disposed adjacent to the local decoder 1101 in the second direction D2 may be connected to other bit line sense amplifiers BLSA00, BLSA01, BLSA02, and BLSA03 corresponding to a sub-array block SCB02.

A local decoder region LDEC is disposed in the part 1111 of the memory device 1100. In some examples, the local decoder region LDEC may be disposed between the global column selection line GCSL0 and the local column selection line CSL0. In some examples, the local decoder region LDEC may be disposed below the sub-array block SCB01 or between two sub-array blocks SCB. The local decoder region LDEC may be located on the lower peri substrate located below the sub-array block SCB. The local decoder region LDEC includes the local decoder 1101.

The control logic circuit (150 of FIG. 1) controls the local decoder 1101 based on the memory block selection signal BLKSEL. Specifically, the control logic circuit (150 of FIG. 1) determines which local column selection line LCSL needs to be activated based on information about a row to be activated corresponding to the row address signal XADDR and information about a column to be activated corresponding to the column address signal YADDR. Thereafter, the control logic circuit (150 of FIG. 1) generates the memory block selection signal BLKSEL which selects a local column selection line LCSL.

In some embodiments, it is assumed that 128 column selection signals are used to drive the memory device. The memory device 400 illustrated in FIG. 4 selects a sub-array block SCB using 128 column selection lines CSL. In contrast, the memory device 1100 of FIG. 11 (for example, when one local decoder 1101 controls four local column selection lines) may select all sub-array blocks SCB through 32 global column selection lines (GCSL) having a local decoder 1101 driven by 2 bit-memory block selection signals BLKSEL. Accordingly, a power consumption used for a read operation or a write operation of the memory device 1100 may be reduced more than a power consumption used for a read operation of a write operation of the memory device 400.

Figure 13:
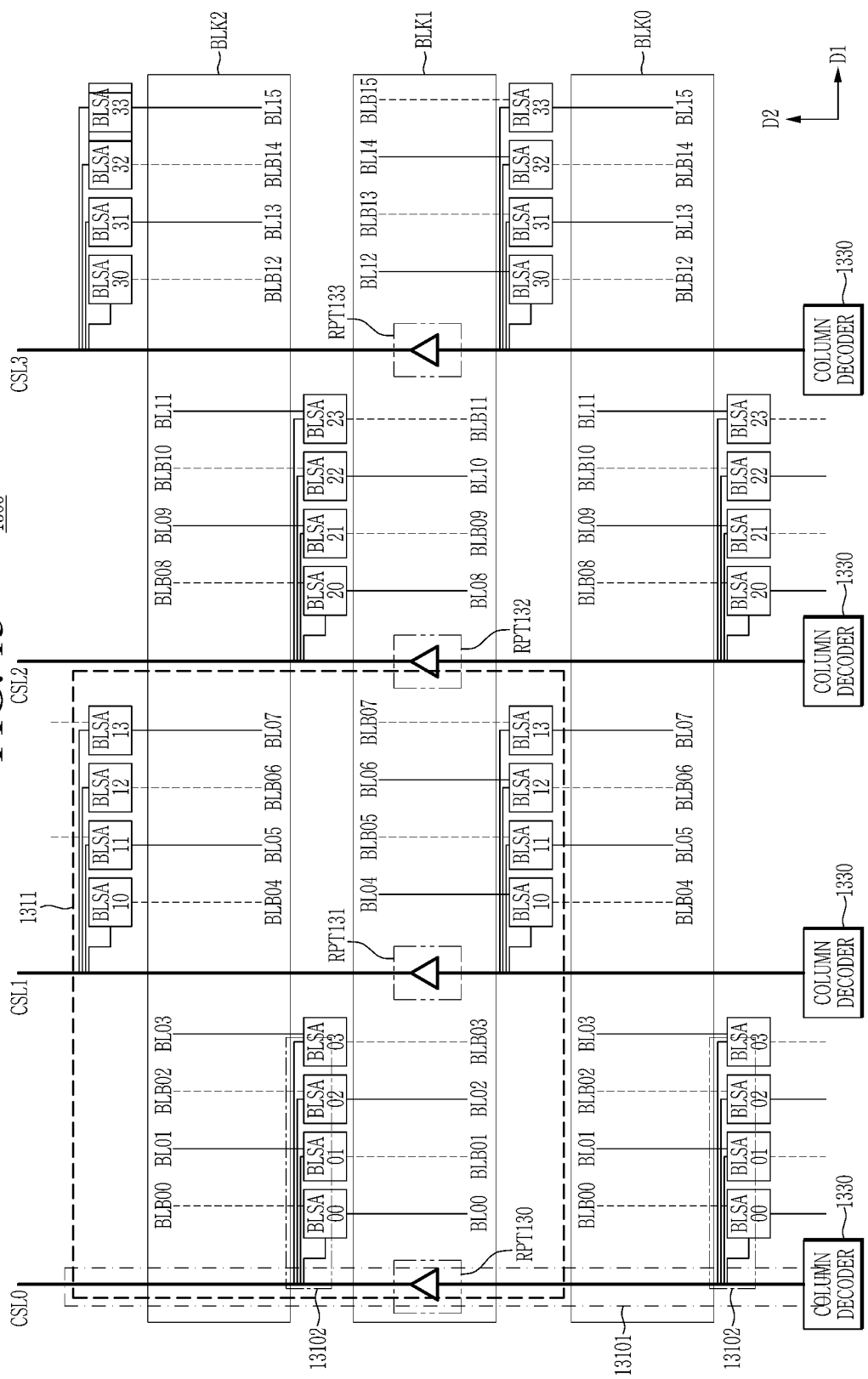
FIG. 13 is a view illustrating still another example of a bank array in a memory device according to an embodiment.

FIG. 13 is a view illustrating still another example of a bank array in a memory device according to an embodiment.

A memory device 1300 includes a plurality of memory blocks BLK0, BLK1, and BLK2, a column decoder 1330, and a row decoder (not shown).

Even though in FIG. 13, it is illustrated that three memory blocks BLK0, BLK1, and BLK2 are included, the present invention is not limited thereto and the memory device 1300 may include more memory blocks. Each of the memory blocks BLK0, BLK1, and BLK2 includes a plurality of bit lines BL0-BL15. In each of the memory blocks BLK0, BLK1, and BLK2, the bit lines BL and the complementary bit lines BLB are alternately disposed. In FIG. 13, the bit line BL is illustrated with a solid line and the complementary bit line BLB is illustrated with a dotted line.

Between the memory blocks BLK0, BLK1, and BLK2, a plurality of bit line sense amplifiers BLSA00, BLSA01, BLSA02, BLSA03, BLSA10, BLSA11, BLSA12, BLSA13, BLSA20, BLSA21, BLSA22, BLSA23, BLSA30, BLSA31, BLSA32, and BLSA33 is disposed. Each of the bit line sense amplifiers BLSA00, BLSA01, BLSA02, BLSA03, BLSA10, BLSA11, BLSA12, BLSA13, BLSA20, BLSA21, BLSA22, BLSA23, BLSA30, BLSA31, BLSA32, BLSA33 is connected to a corresponding bit line.

The column decoder 1330 outputs the column selection signals through a plurality of column selection lines CSL0 to CSL3. The column selection lines CSL0 to CSL3 output from the column decoder 1330 extend in the same direction as the bit line over all the memory blocks BLK0, BLK1, and BLK2. Each of the column selection lines CSL0 to CSL3 is connected to corresponding bit line sense amplifiers among the bit line sense amplifiers BLSA00, BLSA01, BLSA02, BLSA03, BLSA10, BLSA11, BLSA12, BLSA13, BLSA20, BLSA21, BLSA22, BLSA23, BLSA30, BLSA31, BLSA32, and BLSA33. The first column selection line CSL0 is connected to the bit line sense amplifiers BLSA00, BLSA01, BLSA02, and BLSA03 connected to the bit lines BL00 to BL03 and the complementary bit lines BLB00 to BLB03. The second column selection line CSL1 is connected to the bit line sense amplifiers BLSA10, BLSA11, BLSA12, and BLSA13 connected to the bit lines BL04 to BL07 and the complementary bit lines BLB04 to BLB07. The third column selection line CSL2 is connected to the bit line sense amplifiers BLSA20, BLSA21, BLSA22, and BLSA23 connected to the bit lines BL08 to BL11 and the complementary bit lines BLB08 to BLB11. The fourth column selection line CSL3 is connected to the bit line sense amplifiers BLSA30, BLSA31, BLSA32, and BLSA33 connected to the bit lines BL12 to BL15 and the complementary bit lines BLB12 to BLB15. Here, the column decoder 1330 and the bit line sense amplifiers BLSA00, BLSA01, BLSA02, BLSA03, BLSA10, BLSA11, BLSA12, BLSA13, BLSA20, BLSA21, BLSA22, BLSA23, BLSA30, BLSA31, BLSA32, and BLSA33 are formed on a lower peri substrate located below the memory blocks BLK0, BLK1, and BLK2. This will be described in detail below with reference to FIG. 17.

The column decoder 1330 outputs the column selection signals through the column selection lines CSL0 to CSL3 to control an operation of each of the bit line sense amplifiers BLSA00, BLSA01, BLSA02, BLSA03, BLSA10, BLSA11, BLSA12, BLSA13, BLSA20, BLSA21, BLSA22, BLSA23, BLSA30, BLSA31, BLSA32, and BLSA33.

The column selection line CSL0 includes a first part 13101 formed of an upper metal of each of the memory blocks BLK0, BLK1, and BLK2 and a second part 13102 formed of a lower metal of each of the memory blocks BLK0, BLK1, and BLK2. In the meantime, the column selection line which is branched from the column selection line CSL0 of the first part 13101 to be located in the second part 13102 is referred to as a local column selection line. The local column selection line may be formed of the lower metal of the memory blocks BLK0, BLK1, and BLK2 for connection of the column selection line CSL0 of the first part 13101 formed of the upper metal of the memory blocks BLK0, BLK1, and BLK2 and the bit line sense amplifiers BLSA00, BLSA01, BLSA02, and BLSA03 formed on a lower peri substrate of the memory blocks BLK0, BLK1, and BLK2.

Similarly, each of the column selection lines CSL1, CSL2, and CSL3 may include a first part formed of an upper metal of each of the memory blocks BLK0, BLK1, and BLK2 and a second part formed of a lower metal of each of the memory blocks BLK0, BLK1, and BLK2, similar to the column selection line CSL0. Each of the column selection lines which is branched from each of the column selection lines CSL1, CSL2, and CSL3 to be located in the second part is referred to as a local column selection line. The local column selection line may be formed of the lower metal of the memory blocks BLK0, BLK1, and BLK2 for connection of the column selection lines CSL1, CSL2, and CSL3 of the first parts formed of the upper metal of the memory blocks BLK0, BLK1, and BLK2 and the bit line sense amplifiers BLSA10, BLSA11, BLSA12, BLSA13, BLSA20, BLSA21, BLSA22, BLSA23, BLSA30, BLSA31, BLSA32, and BLSA33 formed on the lower peri substrate of the memory blocks BLK0, BLK1, and BLK2.

The memory device 1300 includes a plurality of repeater regions RPT130, RPT131, RPT132, and RPT133 corresponding to each column selection line CSL0, CSL1, CSL2, and CSL3. Repeaters in the repeater regions RPT130, RPT131, RPT132, and RPT133 may be disposed on the lower peri substrate of the memory blocks BLK0, BLK1, and BLK2. Each of the repeater regions RPT130, RPT131, RPT132, and RPT133 may include one or more repeaters. Although not shown, each of the repeaters in the repeater regions RPT130, RPT131, RPT132, and RPT133 may be activated in response to the repeater selection signal RS.

Even though in FIG. 13, each of the column selection lines includes one repeater after extending cross two SCB01 SCB02 sub-array blocks SCBs (see FIG. 14), the present invention is not limited thereto and each column selection line may include more or less number of repeaters. Further, even though in FIG. 13, it is illustrated that a repeater is not disposed on a line transmitted from the column selection line CSL to each of bit line sense amplifiers BLSA00, BLSA01, BLSA02, and BLSA03, the present invention is not limited thereto and one or more repeaters may be included.

In FIG. 13, a plurality of word lines WL located in each of the memory blocks BLK0, BLK1, and BLK2 and sub-word line drivers in the sub-word line driver region SWB connected to each word line WL, and the row decoder are not illustrated.

The connection relationship between the bit line sense amplifier and the bit line in the memory block will be described with reference to FIG. 14.

Figure 14:
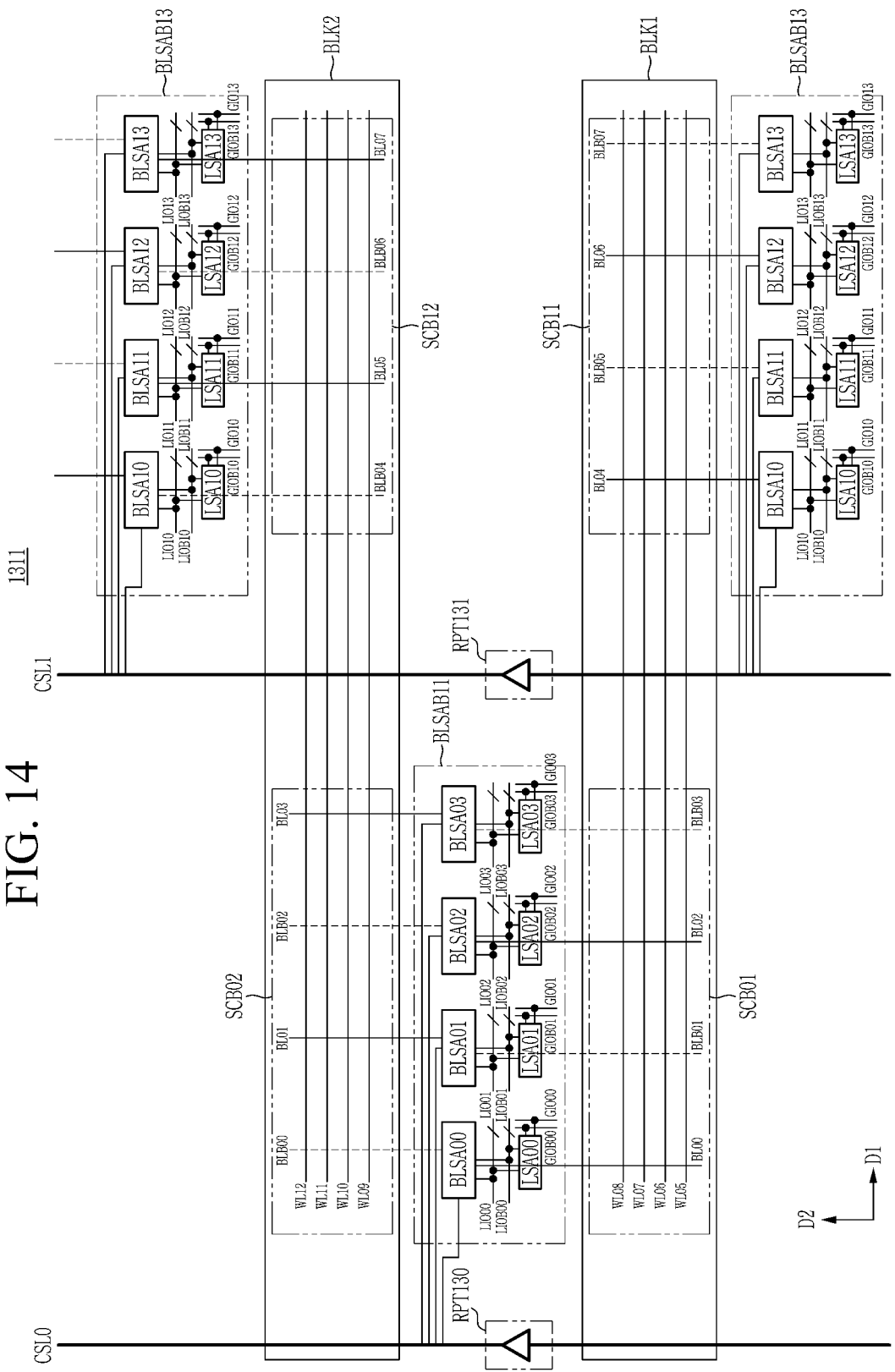
FIG. 14 is a view specifically illustrating a part of a bank array of FIG. 13 according to an embodiment.

FIG. 14 is a view specifically illustrating a part of a bank array of FIG. 13 according to an embodiment. Specifically, FIG. 14 is a view specifically illustrating a part 1311 of the memory device 1300 of FIG. 13.

In the part 1311 of the memory device 1300, sub-array blocks SCB01, SCB02, SCB11, and SCB12 and bit line sense amplifier regions BLSAB11 and BLSAB13 are disposed.

The sub-array block SCB01 includes a plurality of word lines WL05 to WL08, a plurality of bit lines BL00, BLB01, BL02, and BLB03, and a plurality of memory cells connected to the plurality of word lines WL05 to WL08 and the plurality of bit lines BL00, BLB01, BL02, and BLB03. The sub-array block SCB02 includes a plurality of word lines WL09 to WL12, a plurality of bit lines BLB00, BL01, BLB02, and BL03, and a plurality of memory cells connected to the plurality of word lines WL09 to WL12 and the plurality of bit lines BLB00, BL01, BLB02, and BL03.

The sub-array block SCB11 includes the plurality of word lines WL05 to WL08, a plurality of bit lines BL04, BLB05, BL06, and BLB07, and a plurality of memory cells connected to the plurality of word lines WL05 to WL08 and the plurality of bit lines BL04, BLB05, BL06, and BLB07. The sub-array block SCB12 includes the plurality of word lines WL09 to WL12, a plurality of bit lines BLB04, BL05, BLB06, and BL07, and a plurality of memory cells connected to the plurality of word lines WL09 to WL12 and the plurality of bit lines BLB04, BL05, BLB06, and BL07.

The bit line sense amplifier region BLSAB11 is connected to the column selection line CSL0 and is disposed between the sub-array block SCB01 and the sub-array block SCB02. The bit line sense amplifier region BLSAB11 includes the bit line sense amplifiers BLSA00, BLSA01, BLSA02, and BLSA03.

The bit line sense amplifier BLSA00 is connected to a bit line BL00 of the sub-array block SCB01 and a complementary bit line BLB00 of the sub-array block SCB02. The bit line sense amplifier BLSA00 amplifies a difference of voltage levels sensed by the bit line BL00 and the complementary bit line BLB00 and provides the amplified voltage level difference to a local input and output line pair LIO00 and LIOB00. The bit line sense amplifier BLSA00 includes a column selection transistor pair CST (CST1 and CST2 of FIG. 2) to control the connection of the bit line BL00 and the complementary bit line BLB00 and the local input and output line pair LIO00 and LIOB00. A local sense amplifier LSA00 controls the connection of the local input and output line pair LIO00 and LIOB00 and a global input and output line pair GIO00 and GIOB00.

The bit line sense amplifier BLSA01 may be connected to the complementary bit line BLB01 of the sub-array block SCB01 and the bit line BL01 of the sub-array block SCB02. The bit line sense amplifier BLSA01 amplifies a difference of voltage levels sensed by the bit line BL01 and the complementary bit line BLB01 and provides the amplified voltage level difference to a local input and output line pair LIO01 and LIOB01. The bit line sense amplifier BLSA01 includes a column selection transistor pair CST (CST1 and CST2 of FIG. 2) to control the connection of the bit line BL01 and the complementary bit line BLB01 and the local input and output line pair LIO01 and LIOB01. A local sense amplifier LSA01 connected to the local input and output line pair LIO01 and LIOB01 controls the connection of the local input and output line pair LIO01 and LIOB01 and a global input and output line pair GIO01 and GIOB01.

The bit line sense amplifier BLSA02 is connected to the bit line BL02 of the sub-array block SCB01 and the complementary bit line BLB02 of the sub-array block SCB02. The bit line sense amplifier BLSA02 amplifies a difference of voltage levels sensed by the bit line BL02 and the complementary bit line BLB02 and provides the amplified voltage level difference to a local input and output line pair LIO02 and LIOB02. The bit line sense amplifier BLSA02 includes a column selection transistor pair CST (CST1 and CST2 of FIG. 2) to control the connection of the bit line BL02 and the complementary bit line BLB02 and the local input and output line pair LIO02 and LIOB02. A local sense amplifier LSA02 controls the connection of the local input and output line pair LIO02 and LIOB02 and a global input and output line pair GIO02 and GIOB02.

The bit line sense amplifier BLSA03 is connected to the complementary bit line BLB03 of the sub-array block SCB01 and the bit line BL03 of the sub-array block SCB02. The bit line sense amplifier BLSA03 amplifies a voltage level difference sensed by the bit line BL03 and the complementary bit line BLB03 and provides the amplified voltage level difference to a local input and output line pair LIO03 and LIOB03. The bit line sense amplifier BLSA03 includes a column selection transistor pair CST (CST1 and CST2 of FIG. 2) to control the connection of the bit line BL03 and the complementary bit line BLB03 and the local input and output line pair LIO03 and LIOB03. A local sense amplifier LSA03 connected to the local input and output line pair LIO03 and LIOB03 controls the connection of the local input and output line pair LIO03 and LIOB03 and a global input and output line pair GIO03 and GIOB03.

The bit line sense amplifier region BLSAB13 is connected to the column selection line CSL1 and is alternately disposed between the sub-array block SCB11 and the sub-array block SCB12. The bit line sense amplifier region BLSAB13 includes the bit line sense amplifiers BLSA10, BLSA11, BLSA12, and BLSA13.

The bit line sense amplifier BLSA10 is connected to a bit line BL04 of the sub-array block SCB11 and a complementary bit line BLB04 of the sub-array block SCB12. The bit line sense amplifier BLSA10 amplifies a difference of voltage levels sensed by the bit line BL04 and the complementary bit line BLB04 and provides the amplified voltage level difference to a local input and output line pair LIO10 and LIOB10. The bit line sense amplifier BLSA10 includes a column selection transistor pair CST (CST1 and CST2 of FIG. 2) to control the connection of the bit line BL04 and the complementary bit line BLB04 and the local input and output line pair LIO10 and LIOB10. A local sense amplifier LSA10 controls the connection of the local input and output line pair LIO10 and LIOB10 and a global input and output line pair GIO10 and GIOB10.

The bit line sense amplifier BLSA11 is connected to a complementary bit line BLB05 of a sub-array block SCB11 and a bit line BL05 of a sub-array block SCB12. The bit line sense amplifier BLSA11 amplifies a difference of voltage levels sensed by the bit line BL05 and the complementary bit line BLB05 and provides the amplified voltage level difference to a local input and output line pair LIO11 and LIOB11. The bit line sense amplifier BLSA11 includes a column selection transistor pair CST (CST1 and CST2 of FIG. 2) to control the connection of the bit line BL05 and the complementary bit line BLB05 and the local input and output line pair LIO11 and LIOB11. A local sense amplifier LSA11 connected to the local input and output line pair LIO11 and LIOB11 controls the connection of the local input and output line pair LIO11 and LIOB11 and a global input and output line pair GIO11 and GIOB11.

The bit line sense amplifier BLSA12 may be connected to the bit line BL06 of the sub-array block SCB11 and the complementary bit line BLB06 of the sub-array block SCB12. The bit line sense amplifier BLSA12 amplifies a difference of voltage levels sensed by the bit line BL06 and the complementary bit line BLB06 and provides the amplified voltage level difference to a local input and output line pair LIO12 and LIOB12. The bit line sense amplifier BLSA12 includes a column selection transistor pair CST (CST1 and CST2 of FIG. 2) to control the connection of the bit line BL06 and the complementary bit line BLB06 and the local input and output line pair LIO12 and LIOB12. The local sense amplifier LSA02 controls the connection of the local input and output line pair LIO12 and LIOB12 and a global input and output line pair GIO12 and GIOB12.

The bit line sense amplifier BLSA13 is connected to the complementary bit line BLB07 of the sub-array block SCB11 and the bit line BL07 of the sub-array block SCB12. The bit line sense amplifier BLSA13 amplifies a voltage level difference sensed by the bit line BL07 and the complementary bit line BLB07 and provides the amplified voltage level difference to a local input and output line pair LIO13 and LIOB13. The bit line sense amplifier BLSA13 includes a column selection transistor pair CST (CST1 and CST2 of FIG. 2) to control the connection of the bit line BL07 and the complementary bit line BLB07 and the local input and output line pair LIO13 and LIOB13. A local sense amplifier LSA13 connected to the local input and output line pair LIO13 and LIOB13 controls the connection of the local input and output line pair LIO13 and LIOB13 and a global input and output line pair GIO13 and GIOB13.

In FIG. 14, when four bit line sense amplifiers BLSA are connected to the sub-array blocks SCB01, SCB02, SCB11, and SCB12 to activate one word line, four data is output to the bit line sense amplifier BLSA from selected memory cells. However, the present invention is not limited thereto and more bit line sense amplifiers BLSA are connected to each of the sub-array blocks SCB01, SCB02, SCB11, and SCB12.

Further, it is illustrated that the bit line sense amplifiers BLSA connected to each of the sub-array blocks SCB01, SCB02, SCB11, and SCB12 are connected to one column selection line. However, the present invention is not limited hereto so that one column selection line CSL may be connected to one bit line sense amplifier BLSA.

In the memory device 400 which has been described with reference to FIGS. 4 and 5, bit line sense amplifier regions BLSAB01 and BLSAB02 are located at both sides of the sub-array block SCB01 and SCB02. In contrast, in the memory device 1300 which has been described with reference to FIGS. 13 and 14, the bit line sense amplifier region BLSAB11 is located only at one side of the sub-array blocks SCB01 and SCB02. Accordingly, the memory device 1300 is advantageous to increase interval between the sub-array blocks SCB01 and SCB02 or dispose more sub-array blocks in a remaining space to increase a capacity of the memory device 1300.

The control logic circuit (150 of FIG. 1) controls repeaters in the repeater regions RPT130 and RPT131 based on the repeater selection signal RS. When each of the repeaters in the repeater regions RPT130 and RPT131 receives an enable level of repeater selection signal RS, the repeater amplifies a column selection signal input to an input terminal to output the amplified signal to an output terminal. The control logic circuit (150 of FIG. 1) generates a repeater selection signal RS based on a row address signal XADDR.

Figure 15:
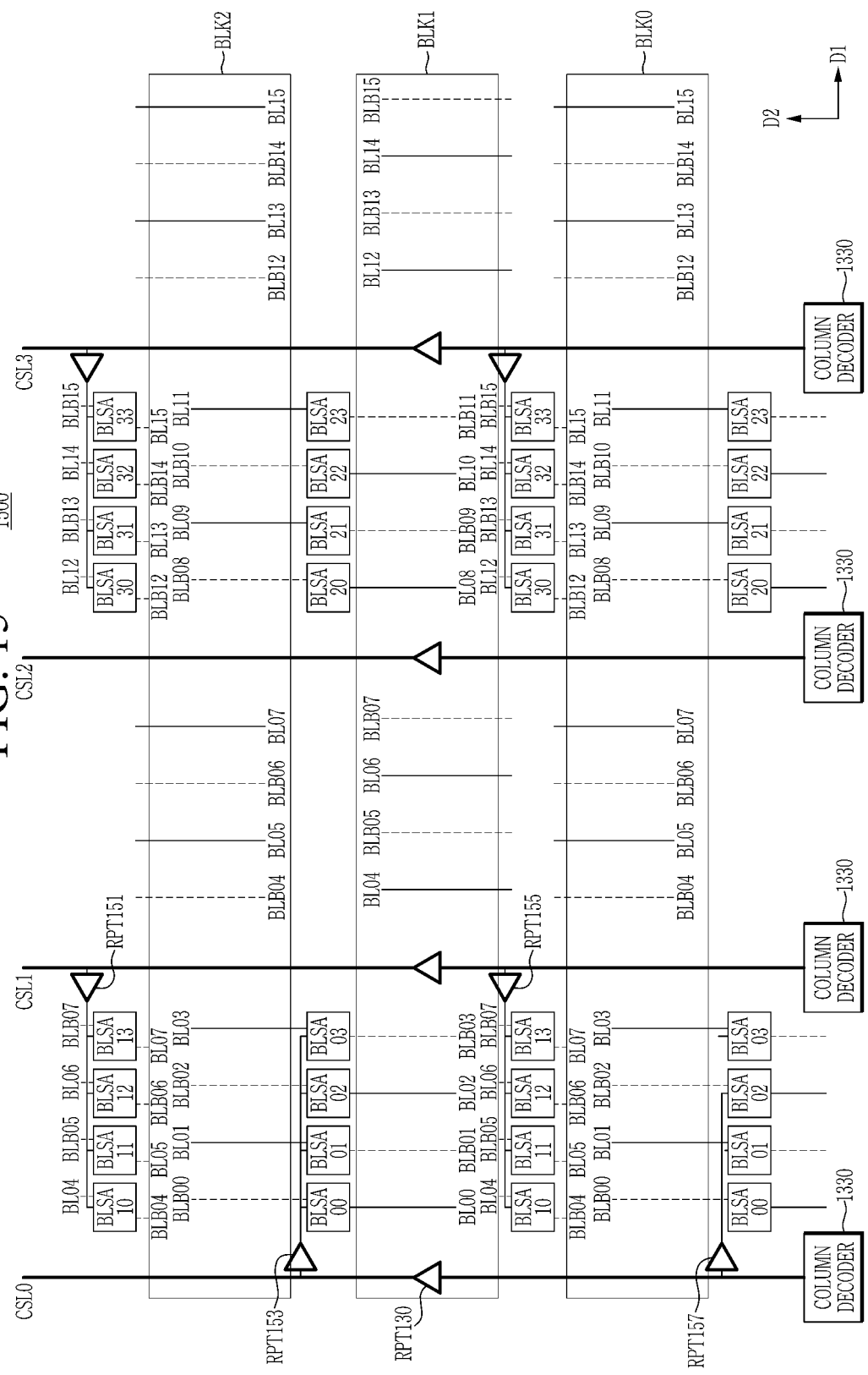
FIG. 15 is a view illustrating still another example of a bank array in a memory device according to an embodiment.

FIG. 15 is a view illustrating still another example of a bank array in a memory device according to an embodiment.

Specifically, a memory device 1500 of FIG. 15 has the same structure as the structure of the memory device 1300 of FIG. 13 except for the placement of the bit line sense amplifiers and the placement of the repeaters in the memory device 1300 which has been described with reference to FIGS. 13 and 14.

The bit line sense amplifiers BLSA10, BLSA11, BLSA12, and BLSA13 and the bit line sense amplifiers BLSA00, BLSA01, BLSA02, and BLSA03 of the memory device 1500 may be disposed on both sides of each of the memory blocks BLK0, BLK1, and BLK2 on the same line in the second direction D2. Specifically, the column selection line CSL0 may be connected to the bit line sense amplifiers BLSA00, BLSA01, BLSA02, and BLSA03 through repeaters RPT153 and RPT157. Further, the column selection line CSL1 may be connected to the bit line sense amplifiers BLSA10, BLSA11, BLSA12, and BLSA13 through repeaters RPT151 and RPT155. In example embodiments, each of the repeaters RPT130, RPT151, RPT153, RPT155, and RPT157 may be activated in response to the repeater selection signal RS.

In the memory device 1500, the bit line sense amplifiers BLSA00, BLSA01, BLSA02, BLSA03, BLSA10, BLSA11, BLSA12, and BLSA13 are disposed between the column selection line CLS0 and the column selection line CSL1 and bit line sense amplifiers BLSA20, BLSA21, BLSA22, BLSA23, BLSA30, BLSA31, BLSA32, and BLSA33 are disposed between the column selection line CLS2 and the column selection line CSL3. Accordingly, the memory device 1500 is advantageous to dispose more sub-array blocks in a space between the column selection line CSL1 and the column selection line CSL2 to increase the capacity of the memory device 1500.

Figure 16:
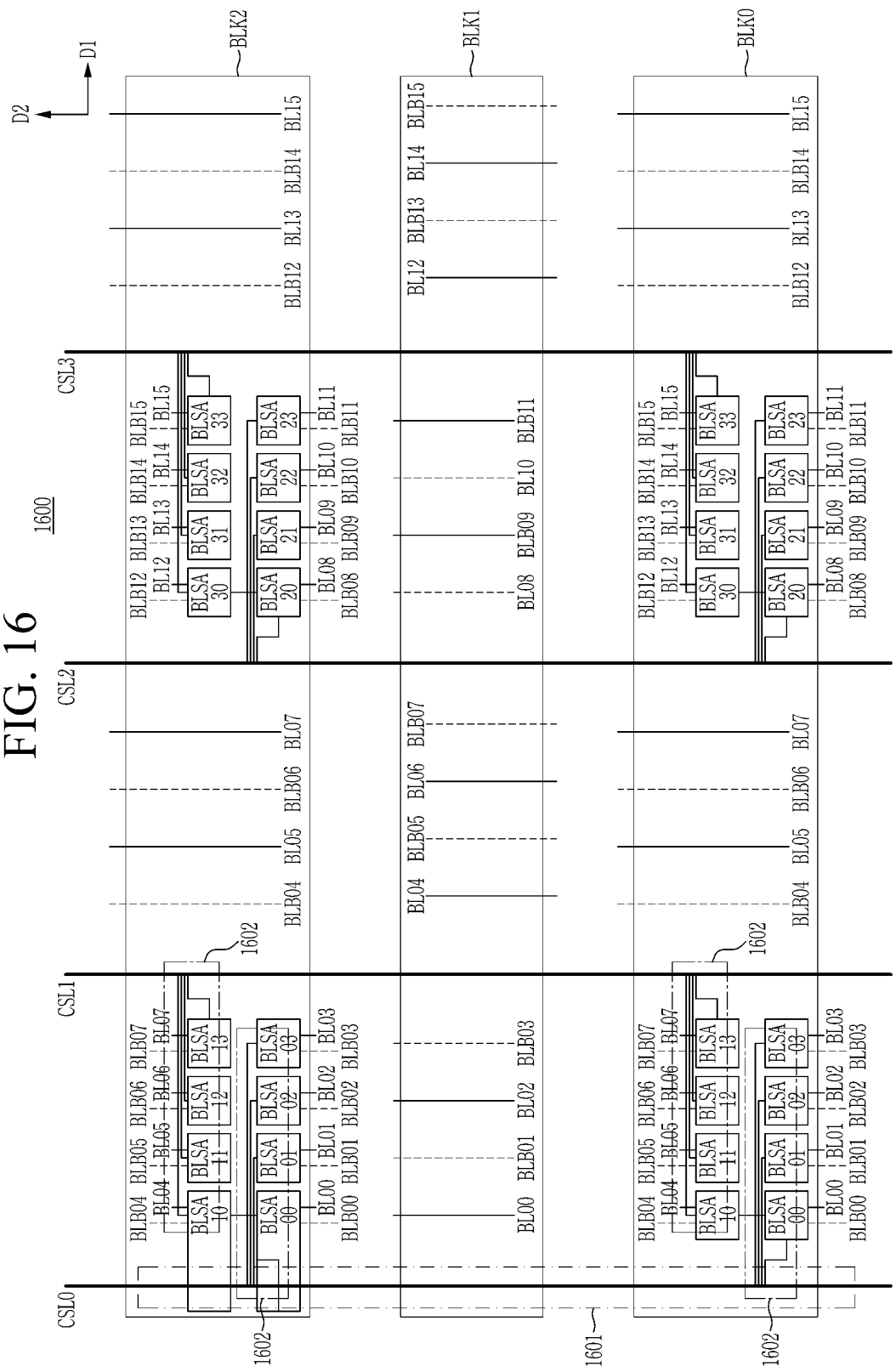
FIG. 16 is a view illustrating still another example of a bank array in a memory device according to an embodiment.

FIG. 16 is a view illustrating still another example of a bank array in a memory device according to an embodiment.

Specifically, a memory device 1600 of FIG. 16 has the same placement structure as FIG. 13 except for the placement of the bit line sense amplifiers in the memory device 1300 which has been described with reference to FIGS. 13 and 14.

Bit line sense amplifiers BLSA00, BLSA01, BLSA02, BLSA03, BLSA10, BLSA11, BLSA12, BLSA13, BLSA20, BLSA21, BLSA22, BLSA23, BLSA30, BLSA31, BLSA32, and BLSA33 of a memory device 1600 may be disposed below a plurality of memory blocks BLK0, BLK1, and BLK2.

Specifically, the bit line sense amplifiers BLSA00, BLSA01, BLSA02, and BLSA03 may be disposed below the memory blocks BLK0, BLK1, and BLK2 in which the bit lines BL00 to BL03 are disposed.

The bit line sense amplifiers BLSA10, BLSA11, BLSA12, and BLSA13 may be disposed below the memory blocks BLK0, BLK1, and BLK2 in which the bit lines BL00 to BL03 are disposed.

The bit line sense amplifiers BLSA20, BLSA21, BLSA22, and BLSA23 may be disposed below the memory blocks BLK0, BLK1, and BLK2 in which the bit lines BL08 to BL11 are disposed.

Further, the bit line sense amplifiers BLSA30, BLSA31, BLSA32, and BLSA33 may be disposed below the memory blocks BLK0, BLK1, and BLK2 in which the bit lines BL08 to BL11 are disposed.

Accordingly, in each of the memory blocks BLK0 and BLK2, bit line sense amplifiers which are driven by even-numbered column selection lines CSL0 and CSL2 are disposed at one side of each of the CSL0 and CSL2 in the first direction D1 (e.g., a right side from each of the even-numbered column selection lines CSL0 and CSL2) and bit line sense amplifiers which are driven by odd-numbered column selection lines CSL1 and CSL3 are disposed at the other side of each of the CSL1 and CSL3 in the first direction D1 (e.g., a left side from each of the odd-numbered column selection lines CSL1 and CSL3).

In the meantime, the column selection line CSL0 includes a first part 1601 formed of an upper metal of each of the memory blocks BLK0, BLK1, and BLK2 and a second part 1602 formed of a lower metal of each of the memory blocks BLK0, BLK1, and BLK2. The column selection line which is branched from the column selection line CSL0 to be located in the second part 1602 is referred to as a local column selection line. The local column selection line may be formed of a lower metal of the memory blocks BLK0, BLK1, and BLK2 for connection of the column selection line CSL0 of the first part 1601 formed of the upper metal of the memory blocks BLK0, BLK1, and BLK2 to the bit line sense amplifiers BLSA00, BLSA01, BLSA02, and BLSA03 formed on a lower peri substrate of the memory blocks BLK0, BLK1, and BLK2.

Similarly, each of the column selection lines CSL1, CSL2, and CSL3 may include a first part formed of an upper metal of each the memory blocks BLK0, BLK1, and BLK2 and a second part formed of a lower metal of each of the memory blocks BLK0, BLK1, and BLK2, similar to the column selection line CSL0. Each of the column selection lines which is branched from each of the column selection lines CSL1, CSL2, and CSL3 to be located in the second part is referred to as a local column selection line. The local column selection line may be formed of the lower metal of the memory blocks BLK0, BLK1, and BLK2 for connection of column selection lines CSL1, CSL2, and CSL3 of the first parts formed of the upper metal of the memory blocks BLK0, BLK1, and BLK2 and the bit line sense amplifiers BLSA10, BLSA11, BLSA12, BLSA13, BLSA20, BLSA21, BLSA22, BLSA23, BLSA30, BLSA31, BLSA32, and BLSA33 formed on the lower peri substrate of the memory blocks BLK0, BLK1, and BLK2.

In example embodiments, one or more repeaters may be disposed on a path of each of the column selection lines CSL1, CSL2, and CSL3. In this case, one of the repeaters disposed on the path of each of the column selection lines CSL1, CSL2, and CSL3 may be activated in response to the repeater selection signal RS.

The memory device 1600 has an advantage in that the bit line sense amplifiers BLSA00, BLSA01, BLSA02, BLSA03, BLSA10, BLSA11, BLSA12, BLSA13, BLSA20, BLSA21, BLSA22, BLSA23, BLSA30, BLSA31, BLSA32, and BLSA33 are disposed below the memory blocks BLK0, BLK1, and BLK2 to increase an interval between the memory blocks BLK0, BLK1, and BLK2 or dispose more memory blocks in a remaining space to increase a capacity of the memory device 1600.

Figure 17:
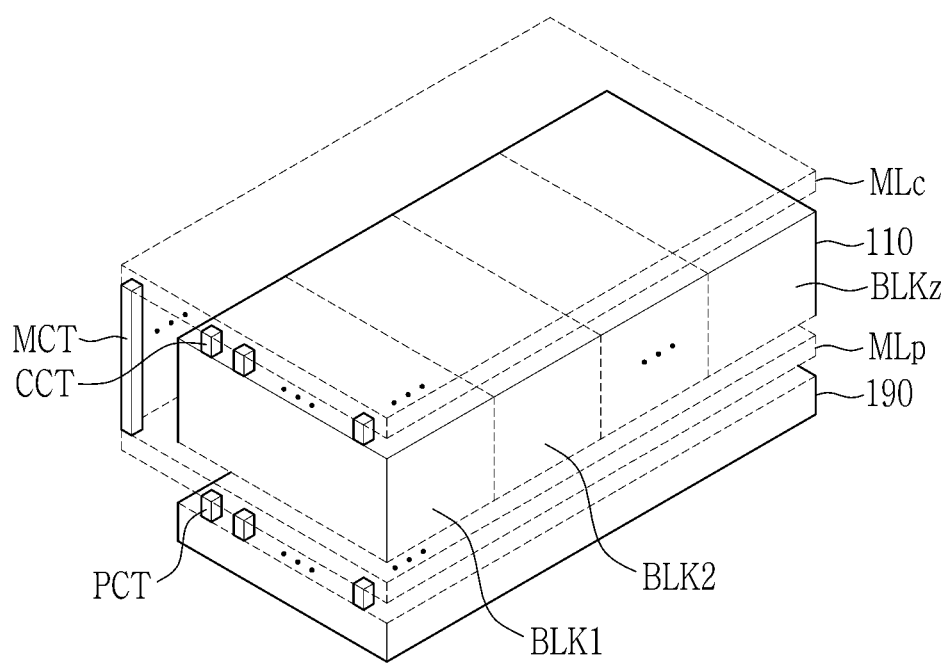
FIG. 17 is a view illustrating a vertical structure of a memory device according to an embodiment.

FIG. 17 is a view illustrating a vertical structure of a memory device according to an embodiment.

As illustrated in FIG. 17, a memory device 100 includes a memory cell array 110 and a peripheral circuit 190.

The memory cell array 110 and the peripheral circuit 190 are connected to each other through a cell region metal layer MLc and a peripheral area metal layer MLp.

The cell region metal layer MLc is disposed on the memory cell array 110. The cell region metal layer MLc includes a plurality of cell wires. For example, the cell region metal layer MLc includes the global column selection line GCSL (e.g., GCSL of FIG. 8) or the column selection line CSL described herein.

The peripheral area metal layer MLp may be formed on the peripheral circuit 190 and below the memory cell array 110. The peripheral area metal layer MLp includes a plurality of peripheral wires. For example, the peripheral area metal layer MLp includes the local column selection line described herein.

The memory cell array 110 is connected to the cell region metal layer MLc through a cell contact CCT. The peripheral circuit 190 is connected to the peripheral area metal layer MLp through the peripheral contact PCT. The cell region metal layer MLc and the peripheral area metal layer MLp may be connected through the contact MCT between the metal layers. In the meantime, even though in FIG. 17, it is illustrated that the memory cell array 110 and the peripheral circuit 190 are formed on a separate substrates, the present invention is not limited thereto and the memory cell array 110 and the peripheral circuit 190 may be formed on one substrate. In this case, the cell region metal layer MLc and the peripheral area metal layer MLp may be laminated on one substrate or in one substrate.

In FIG. 17, the cell contact CCT, the peripheral contact PCT, or the contact MCT between metal layers may be illustrated only in a particular part. However, the cell contact CCT may be provided in any part above the memory cell array 110. The peripheral contact PCT may be provided in any part above the peripheral circuit 190. The contact MCT between metal layers may be provided in any part between the cell region metal layer MLc and the peripheral area metal layer MLp. Here, when the memory cell array 110 and the peripheral circuit 190 are formed on one substrate, the memory device 100 may not include the cell contact CCT and the peripheral contact PCT.

The memory cell array 110 may have a three-dimensional structure (or a vertical structure). For example, memory blocks BLK1 to BLKz may form a structure laminated along a second direction on a plane extending along first and third directions.

The peripheral circuit 190 includes the row decoder 112, the bit line sense amplifier array 120, the I/O gate circuit 140, the control logic circuit 150, and the local sense amplifier 160 described herein. Further, the peripheral circuit 190 may include the local decoder (1101 of FIG. 11) and the plurality of repeaters RPT described herein. The peripheral circuit 190 may have a planar structure. The peripheral circuit 190 may be formed on a plane extending along the first and third directions.

The peripheral circuit 190 may be formed on a peri substrate located below the memory cell array 110. The peri substrate including the peripheral circuit 190 may be the lower peri substrate which has been described with reference to FIGS. 4, 6, 7, 11-13, and 16. This structure may be referred to as a cell over peri (COP) structure.

The peripheral circuit 190 includes a plurality of transistors to perform various functions. Each transistor includes a gate electrode, and source and drain regions which are symmetrically disposed with respect to the gate electrode. The source region is connected to the peripheral area metal layer MLp through a plurality of peripheral contacts PCT. The drain region is also connected to the peripheral area metal layer MLp through the plurality of peripheral contacts PCT.

Figure 18:
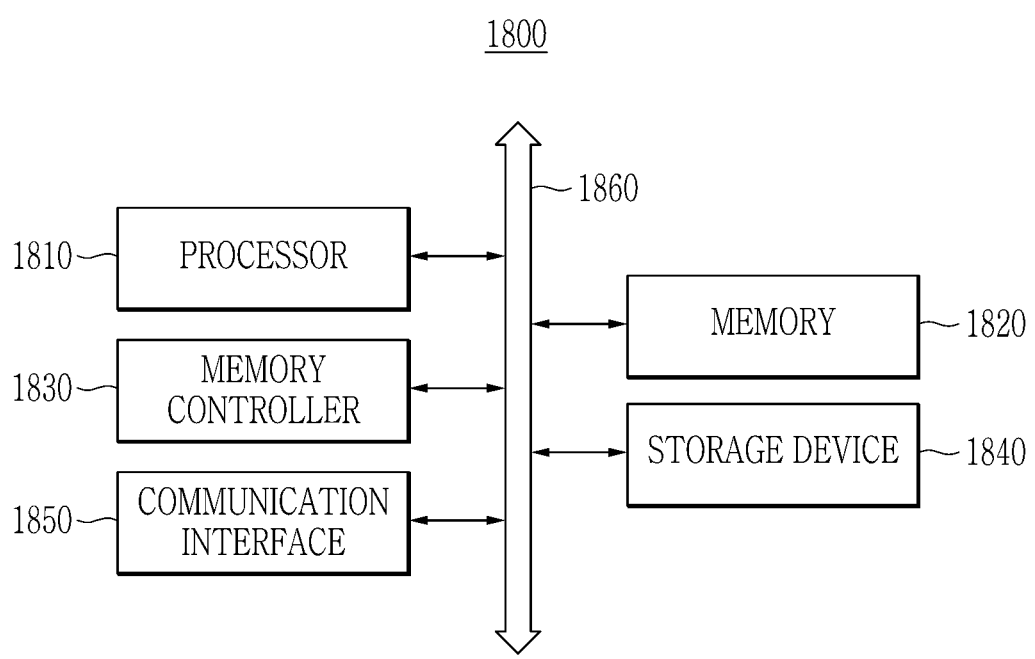
FIG. 18 is a block diagram illustrating a computer device according to an embodiment.

FIG. 18 is a block diagram illustrating a computer device according to an embodiment.

Referring to FIG. 18, a computing device 1800 includes a processor 1810, a memory 1820, a memory controller 1830, a storage device 1840, a communication interface 1850, and a bus 1860. The computing device 1800 may further include other general-purpose constituent elements.

The processor 1810 controls an overall operation of each configuration of the computing device 1800. The processor 1810 is implemented by at least one of various processing units such as a central processing unit (CPU), an application processor (AP), and a graphic processing unit (GPU).

The memory 1820 stores various data and instructions. The memory 1820 may be implemented by a memory device which has been described with reference to FIGS. 1 to 17. The memory controller 1830 controls the transmission of data or instruction to the memory 1820 and from the memory 1820. In some embodiments, the memory controller 1830 may be provided as a separate chip from the processor 1810. In some embodiments, the memory controller 1830 may be provided as an internal configuration of the processor 1810.

The storage device 1840 may non-temporarily store the program and data. In some embodiments, the storage device 1840 may be implemented by a non-volatile memory. The communication interface 1850 supports wired/wireless Internet communication of the computing device 1800. Further, the communication interface 1850 may support various communication methods other than the Internet communication. The bus 1860 provides a communication function between constituent elements of the computing device 1800. The bus 1860 includes at least one tangible bus according to the communication protocol between the constituent elements.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

What is claimed is:

1. A memory device comprising:
   a memory cell array including a plurality of memory cells connected to a plurality of word lines and a plurality of bit lines;
   a plurality of column selection lines each extending over the memory cell array, including a first part and a second part connected to the first part, and configured to transmit a column selection signal;
   a plurality of bit line sense amplifiers each connected to a bit line among the plurality of bit lines and configured to sense data stored in a memory cell among the plurality of memory cells;
   a plurality of local sense amplifiers each configured to output the sensed data from one of the bit line sense amplifiers through a column selection transistor connected to a local column selection line among a plurality of local column selection lines;
   a control logic circuit configured to generate a row address signal indicating an activation word line among the plurality of word lines and a column address signal indicating an activation bit line among the plurality of bit lines;
   a column decoder configured to activate a column selection line among the plurality of column selection lines based on the column address signal; and
   a plurality of first repeaters connected to each of the column selection lines and each configured to activate a local column selection line among the plurality of local column selection lines in response to a repeater selection signal such that a corresponding one or more column selection transistors are activated,
   wherein the control logic circuit is further configured to generate the repeater selection signal based on the row address signal.

2. The memory device of claim 1, wherein the first part of each of the column selection lines is formed of an upper metal disposed above the memory cell array and the second part of each of the column selection lines is formed of a lower metal disposed below the memory cell array.

3. The memory device of claim 1, wherein each of the plurality of first repeaters includes an input terminal connected to the first part of each of the column selection lines and an output terminal connected to each of the plurality of local column selection lines, and is configured to amplify the column selection signal input to the input terminal and to transmit the amplified signal to the local column selection line.

4. The memory device of claim 3, wherein each of the plurality of first repeaters includes a first transistor configured to amplify the column selection signal in response to the repeater selection signal, and
   wherein a size of the first transistor of a first repeater among the plurality of first repeaters spaced apart from the column decoder with a first distance is smaller than a size of the first transistor of a second repeater among the plurality of first repeaters spaced apart from the column decoder with a second distance which is longer than the first distance.

5. The memory device of claim 4, wherein:
the memory cell array includes a plurality of sub-array blocks each including a first set of word lines among the plurality of word lines, and
a first local column selection line from the first repeater connects to column selection transistors for a first number of sub-array blocks and a second local column selection line from the second repeater connects to column selection transistors for a second number of sub-array blocks smaller than the first number of sub-array blocks.

6. The memory device of claim 1, wherein:
the memory cell array has a vertical structure,
the memory device includes a peri substrate located below the memory cell array, and
the plurality of bit line sense amplifiers, the control logic circuit, and the column decoder are formed on the peri substrate.

7. The memory device of claim 1, wherein the memory cell array includes a plurality of memory blocks extended in a first direction and spaced apart from each other in a second direction, each memory block including a plurality of sub-array blocks each including a first set of word lines among the plurality of word lines, and
wherein a plurality of first bit line sense amplifiers and column selection transistors are disposed between first sub-array blocks included in a first memory block and second sub-array blocks included in a second memory block adjacent to the first memory block in the second direction or disposed below the memory cell array.

8. The memory device of claim 7, wherein some of the plurality of first repeaters are disposed between the first and second sub-array blocks in the second direction.

9. The memory device of claim 1, further comprising:
a plurality of second repeaters each disposed on a path of each of the column selection lines and configured to activate a corresponding column selection line in response to the repeater selection signal.

10. A memory device comprising:
a memory cell array divided into a plurality of memory blocks extending in a first direction, disposed along a second direction intersecting the first direction, and including a plurality of word lines, a plurality of bit lines, and a plurality of memory cells connected to the plurality of word lines and the plurality of bit lines;
a plurality of column selection lines extending in the second direction and including odd-numbered column selection lines and even-numbered column selection lines alternately disposed in the first direction; and
a plurality of bit line sense amplifiers each connected to a bit line among the plurality of bit lines, including a column selection transistor connected to the bit line, and configured to sense data stored in a memory cell among the plurality of memory cells and to transfer the sensed data to a local input and output line through the column selection transistor, the plurality of bit line sense amplifiers comprising:
a plurality of first bit line sense amplifiers which are connected to a plurality of first bit lines among the plurality of bit lines included in a first memory block among the plurality of memory blocks and are commonly connected to one even-numbered column selection line among the even-numbered column selection lines; and
a plurality of second bit line sense amplifiers which are connected to a plurality of second bit lines among the plurality of bit lines included in the first memory block and are commonly connected to one odd-numbered column selection line among the odd-numbered column selection lines,
wherein the plurality of first bit line sense amplifiers are disposed at ene a first side of each of the even-numbered column selection lines in the first direction and the plurality of second bit line sense amplifiers are disposed at a second side of each of the odd-numbered column selection lines in the first direction,
wherein the first side of each of the even-numbered column selection lines and the second side of each of the odd-numbered column selection lines are located on opposite sides, based on their respective column selection lines, and
wherein the plurality of first and second bit line sense amplifiers are disposed between the one odd-numbered column selection line and the one even-numbered column selection line in the first direction.

11. The memory device of claim 10, wherein:
the memory cell array has a vertical structure,
the memory device includes a peri substrate located below the memory cell array, and
the plurality of first bit line sense amplifiers and the plurality of second bit line sense amplifiers are located on the peri substrate.

12. The memory device of claim 11, wherein the plurality of first bit line sense amplifiers and the plurality of second bit line sense amplifiers are located in a region overlapping the plurality of first bit lines of the peri substrate.

13. The memory device of claim 12, further comprising:
a control logic circuit configured to generate a row address signal indicating an activation word line among the plurality of word lines and a column address signal indicating an activation bit line among the plurality of bit lines; and
a plurality of repeaters each disposed on a path of each of the plurality of column selection lines and each configured to activate a corresponding column selection line in response to a repeater selection signal,
wherein the control logic circuit is further configured to generate the repeater selection signal based on the row address signal.

14. The memory device of claim 13, wherein each of the plurality of memory blocks includes a plurality of sub-array blocks each including a first set of word lines among the plurality of word lines, and
wherein the plurality of repeaters are disposed below the memory cell array or between two adjacent sub-array blocks in the second direction.

15. The memory device of claim 10, wherein each of the plurality of column selection lines includes a first part extending in the second direction and a second part extending in the first direction, and
wherein the first part of each of the plurality of column selection lines is formed of an upper metal disposed above the memory cell array and the second part of each of the plurality of column selection lines is formed of a lower metal disposed below the memory cell array.

16. A memory device comprising:
a memory cell array divided into a plurality of memory blocks each extending in a first direction and spaced apart from each other in a second direction intersecting the first direction, the memory cell array including a plurality of memory cells connected to a plurality of word lines and a plurality of bit lines;

a control logic circuit configured to generate a row address signal indicating an activation word line among the plurality of word lines and a column address signal indicating an activation bit line among the plurality of bit lines;

a plurality of global column selection lines extending in the second direction;

a plurality of local column selection lines each including a first part extending in the second direction and a second part extending in the first direction and branched from the first part of each of the plurality of local column selection lines;

a column decoder configured to activate a global column selection line among the plurality of global column selection lines in response to the column address signal; and a plurality of bit line sense amplifiers each connected to a bit line among the plurality of bit lines, including a column selection transistor connected to a local column selection line among the plurality of local column selection lines, and configured to sense data stored in a memory cell among the plurality of memory cells and to transfer the sensed data to a local input and output line through the column selection transistor; and a plurality of local decoders connected to each of the global column selection lines and each configured to activate a local column selection line among the plurality of local column selection lines in response to a memory block selection signal and the column address signal, wherein each of the plurality of global column selection lines is formed of an upper metal layer disposed above the memory cell array and each of the plurality of local column selection lines is formed of a lower metal layer disposed below the memory cell array, and wherein the control logic circuit is further configured to generate the memory block selection signal based on the row address signal.

17. The memory device of claim 16, wherein the plurality of local decoders are located below the memory cell array.

18. The memory device of claim 16, wherein each of the memory blocks includes a plurality of sub-array blocks each including a first set of word lines among the plurality of word lines, wherein each of the plurality of local decoders configured to provide a plurality of first local column selection signals to a plurality of first local column selection lines among the plurality of local column selection lines, and configured to activate one of the plurality of first local column selection lines in response to the memory block selection signal and the column address signal, and wherein each of the plurality of first local column selection lines connects to a plurality of first bit line sense amplifiers for a sub-array block among the plurality of sub-array blocks.

19. The memory device of claim 18, wherein each of the plurality of local decoders is located between two adjacent sub-array blocks in the second direction.

* * * * *